(12) United States Patent
Fox et al.

(10) Patent No.: US 11,635,312 B2
(45) Date of Patent: Apr. 25, 2023

(54) SYSTEMS AND METHODS FOR REMOTE SENSOR CALIBRATION

(71) Applicant: Honeywell International Inc., Morris Plains, NJ (US)

(72) Inventors: Richard B. Fox, San Tan Valley, AZ (US); John Rogers, Weymouth (GB); Ian Kerr, Broadway (GB); Daniel Pearce, Chard (GB)

(73) Assignee: Honeywell International Inc., Charlotte, NC (US)

( * ) Notice: Subject to any disclaimer, the term of this patent is extended or adjusted under 35 U.S.C. 154(b) by 351 days.

(21) Appl. No.: 16/921,401

(22) Filed: Jul. 6, 2020

(65) Prior Publication Data
US 2022/0003581 A1    Jan. 6, 2022

(51) Int. Cl.
G01D 18/00    (2006.01)
G01D 3/02    (2006.01)
G01D 3/028    (2006.01)

(52) U.S. Cl.
CPC ........... G01D 18/004 (2013.01); G01D 3/022 (2013.01); G01D 3/028 (2013.01)

(58) Field of Classification Search
None
See application file for complete search history.

(56) References Cited

U.S. PATENT DOCUMENTS

| | | | |
|---|---|---|---|
| 9,336,353 B2 * | 5/2016 | Valdes | G16H 20/17 |
| 9,723,987 B2 | 8/2017 | Goetz | |
| 10,043,363 B2 * | 8/2018 | Riedel | G08B 17/117 |
| 10,295,457 B1 | 5/2019 | Ocheltree | |
| 10,335,075 B2 | 7/2019 | Vanslyke et al. | |
| 10,697,947 B1 * | 6/2020 | Armitage | E21B 41/00 |
| 2010/0223020 A1 | 9/2010 | Goetz | |
| 2013/0030718 A1 | 1/2013 | Williams et al. | |

(Continued)

FOREIGN PATENT DOCUMENTS

| | | |
|---|---|---|
| CA | 2924663 A1 | 9/2017 |
| CN | 103499948 A | 1/2014 |

(Continued)

OTHER PUBLICATIONS

U.S. Appl. No. 17/304,798, filed Jun. 25, 2021, naming inventors Pearce et al.

(Continued)

*Primary Examiner* — Brandi N Hopkins
*Assistant Examiner* — Nigel H Plumb
(74) *Attorney, Agent, or Firm* — Shumaker & Sieffert, P.A.

(57) ABSTRACT

This disclosure is directed to methods, computer program products, and systems for calibrating one or more remote sensing devices in an environment. The disclosed technology relates to a calibration device configured to determine measurement data within an environment. The calibration device may transmit the measurement values, or other calibration data items, to a remote sensing device via a wireless link while the remote sensing device stays with a structure in which the remote sensing device is commissioned to operate. In response to receiving the calibration data items, the remote sensing device may adjust one or more settings of the remote sensing device in order to satisfy a calibration threshold.

18 Claims, 9 Drawing Sheets

(56) References Cited

U.S. PATENT DOCUMENTS

| | | | |
|---|---|---|---|
| 2013/0116958 A1* | 5/2013 | Kristensson | H04M 1/72412 |
| | | | 702/85 |
| 2016/0214723 A1* | 7/2016 | Fox | B64D 13/06 |
| 2016/0214724 A1* | 7/2016 | Fox | F24F 11/32 |
| 2018/0118351 A1 | 5/2018 | Fox et al. | |
| 2018/0148180 A1 | 5/2018 | Fagundes et al. | |
| 2018/0266856 A1* | 9/2018 | Broadley | G01D 18/008 |
| 2018/0346130 A1* | 12/2018 | Jouper | G08B 21/12 |
| 2019/0100318 A1* | 4/2019 | Space | B01D 53/72 |
| 2019/0173885 A1 | 6/2019 | Barreras et al. | |
| 2019/0187115 A1* | 6/2019 | Bartosz | B64D 45/00 |

FOREIGN PATENT DOCUMENTS

| | | |
|---|---|---|
| CN | 107976722 A | 5/2018 |
| KR | 20150107325 A | 9/2015 |

OTHER PUBLICATIONS

Committee on Air Quality in Passenger Cabins of Commercial Aircraft, Board on Environmental Studies and Toxicology, Division on Earth and Life Studies, National Research Council, "The Airliner Cabin Environment and the Health of Passengers and Crew," National Academy Press, (Applicant points out, in accordance with MPEP 609.04(a), that the year of publication, 2002, is sufficiently earlier than the effective U.S. filing date, so that the particular month of publication is not in issue.), 2002, 345 pp.

Hall Jr. et al., "Monitoring Aircraft Cabin Particulate Matter Using a Wireless Sensor Network," American Institute of Aeronautics and Astronautics, Boise State University, Scholar Works, DOI:10.2514/6.2013-3345, Jul. 14, 2013, 18 pp.

* cited by examiner

SYSTEMS AND METHODS FOR REMOTE SENSOR CALIBRATION

STATEMENT REGARDING FEDERALLY SPONSORED RESEARCH OR DEVELOPMENT

This invention was made with Government support under 113109 awarded by UK ATI (United Kingdom Aerospace Technologies Institute). The Non-US Government may have certain rights in the invention.

TECHNICAL FIELD

This disclosure generally relates to systems and methods for calibrating sensors of a vehicle and/or building.

BACKGROUND

Sensor systems have become increasingly relied upon in a wide array of industrial, commercial, and domestic applications. Some environments or devices include particular sensor systems that perform various monitoring or diagnostic functions to facilitate proper operation of a particular enclosure, device, or vehicle system. A sensor system may include one or more sensors configured to measure carbon dioxide, carbon monoxide, pressure, temperature, humidity, particle count, particle mass, particle size, volatile organic hydrocarbons, and/or a range of other measurement parameters. Such sensor systems may include sensors that are remotely located throughout areas of an enclosure, device, or vehicle system. In an example, sensor systems may be installed in various applications including vehicle applications, such as an aircraft, spacecraft, motor vehicle, or watercraft applications or may be installed in buildings, such as in homes, commercial buildings, or industrial buildings. As such, various sensor systems may be employed in an overall system environment or utilized by various control systems. In some examples, such sensor systems may be utilized to provide a sense of the various conditions of the environment in which the overall system is attempting to operate.

SUMMARY

This disclosure is directed to methods, devices, systems, and computer program products for calibrating sensing devices for various vehicles or buildings. In some examples, a calibration device, such as a portable calibration tool, may sense data relative to a particular measurement parameter of an environment in which a remote sensing device is situated. In such examples, the calibration device may be calibrated previously in another environment, such as in a laboratory environment or other development environment. The calibration device may then utilize the sensed data to cause an adjustment to the remote sensing device.

In some examples, the calibration device may transmit measurement data corresponding to the sensed parameter to the remote sensing device. In an example, the remote sensing device may obtain measurement data from the calibration device via a wireless link. The remote sensing device may then utilize the measurement data to adjust one or more settings of the remote sensing device. In such examples, the remote sensing device may perform a self-calibration by identifying a calibration offset between measurement data obtained via the calibration device and the measurement values of the remote sensing device. At the time of calibration, the remote sensing device may remain affixed to a vehicle, building, or other remote structure.

In one example, an apparatus for performing a sensor calibration is disclosed, the apparatus comprising: a memory; communication circuitry configured to communicate with one or more sensing devices; and one or more processors coupled to the memory, wherein the one or more processors are configured to: identify a sensing device that has been affixed to a structure, wherein the sensing device senses measurement data relating to at least one parameter of an environment; determine one or more measurement values within the environment, wherein the one or more measurement values relate to the at least one parameter; transmit, via a wireless link, the one or more measurement values to the sensing device while the sensing device is affixed to the structure; and receive a confirmation signal from the sensing device indicating that an adjustment to the sensing device has occurred, wherein the adjustment to the sensing device is configured to occur in accordance with the one or more measurement values.

In another example, a system for performing a sensor calibration is disclosed, the system comprising: at least one sensing device; and a calibration device, the calibration device configured to calibrate the at least one sensing device while the at least one sensing device is integrated into a production environment, wherein the calibration device is configured to: utilize a calibration setting to sense data relating to at least one parameter of the production environment, wherein the calibration setting is preset in a development environment that is separate and distinct from the production environment; and communicate the sensed data to the at least one sensing device while the at least one sensing device is integrated into the production environment, wherein the at least one sensing device is configured to perform a calibration of one or more sensor components of the at least one sensing device in response to receiving the sensed data from the calibration device.

In another example, a method for calibrating a sensing device is disclosed, the method comprising: providing a calibration device configured to communicate wirelessly with a plurality of sensing devices, the calibration device configured to: obtain, while operating in a first environment, a first set of measurement input values, apply a first transform to the first set of measurement input values to determine one or more output measurement values, and in response to an offset between a reference measurement value and the one or more output measurement values, adjust one or more settings of the calibration device, establishing, via communication circuitry of the calibration device, a wireless communication link with a sensing device of the plurality of sensing device, the first sensing device configured to: obtain, when operating in a second environment, a plurality of sensor inputs that relate to a measurement parameter, and apply a second transform to the sensor inputs to determine a plurality of sensor outputs; wherein the method further comprises: obtaining, via the calibration device, a second set of measurement input values, wherein the second set of measurement input values relate to the measurement parameter; determining, via the calibration device, a second set of output measurement values from the second set of measurement input values in accordance with the first transform, the second set of output measurement values corresponding to the measurement parameter; and utilizing the second set of output measurement values to cause an adjustment to the second transform of the sensing device. The method may be implemented in processing circuitry of the calibration device, processing circuitry of the sensing device, or in both processing circuitry of the calibration device and the sensing device.

In another example, an apparatus configured for sensor calibration is disclosed, wherein the apparatus comprises means for performing one or more of the various techniques of this disclosure. In an example, the apparatus comprises: means for establishing a wireless communication link with a sensing device, wherein the sensing device is configured to: obtain one or more sensor inputs, and apply a transform to the one or more sensor inputs to determine one or more air quality parameters of a vehicle; means for obtaining a set of reference values; means for determining an output measurement value from the set of reference values; and means for utilizing the output measurement value to calibrate the sensing device while the sensing device is situated within the vehicle.

In another example, a non-transitory computer-readable storage medium having stored thereon instructions is disclosed. The instructions, when executed, cause one or more processors to: determine a presence of a remote sensing device, the remote sensing device configured to receive a calibration update; establish a wireless communication link with the remote sensing device, wherein the sensing device includes one or more sensors; determine one or more measurement values indicative, each measurement value indicative of a condition of an environment in which the sensing device is situated; transmit the one or more measurement values, via the wireless communication link, to the sensing device; determine a calibration of the sensing device, wherein the calibration is based at least in part on the one or more measurement values.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Figure 1:
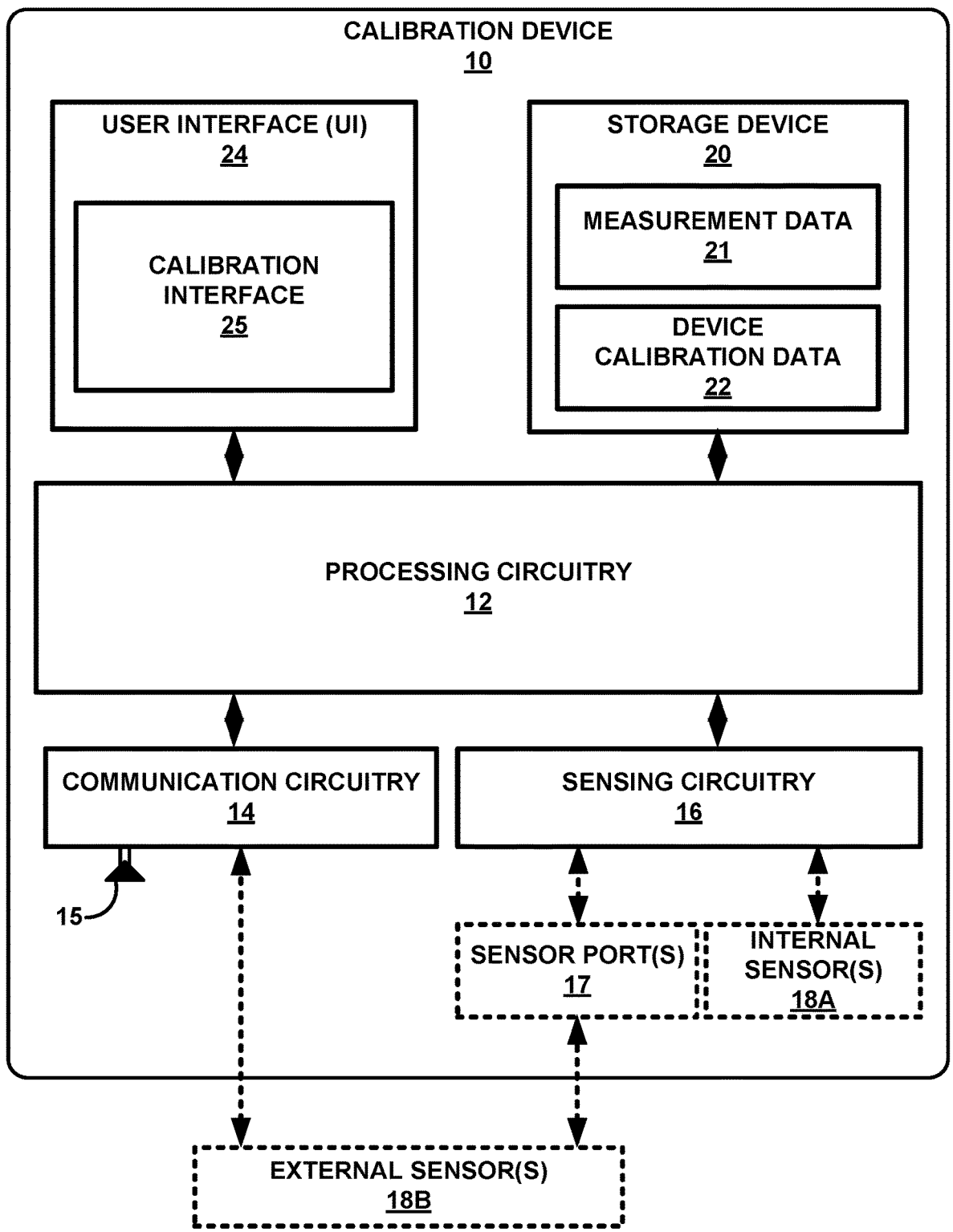
FIG. 1 is a conceptual block diagram depicting an example calibration device, in accordance with aspects of this disclosure.

Various examples are described below that are generally directed to apparatuses, methods, systems, and computer program products, that relate to the calibration of remote sensing devices affixed to a structure. In particular, a calibration device is disclosed that may be used to calibrate a remote sensing device associated with or otherwise affixed to a structure, such as a vehicle, building, or other installation environment. In an example, the remote sensing device may be permanently or semi-permanently affixed in an installation environment or may have otherwise been affixed to the structure to then become part of the structure for a period of time. In addition, the remote sensing device may include one or more internal sensors configured to measure various parameters of an environment, such as an air quality parameter of the environment. A remote sensing device may be remote in the sense that a sensing device can be included as part of various different environments and/or across separately situated environments. In addition, a remote sensing device may be remotely situated relative to the calibration device.

In some examples, remote sensing devices may be calibrated to alleviate the potential for outputting incorrect measurement data or otherwise causing an unintended outcome. To maintain data reliability for various remote sensing devices in a production environment, such as in a field environment, a remote sensing device may be calibrated periodically, such as on a predetermined calibration schedule. In addition, or alternatively, readings from the remote sensing device may be periodically verified to ensure the remote sensing device is outputting measurement readings that appear to accurately represent the actual conditions of an environment in which the remote sensing device is situated.

To calibrate a remote sensing device installed in some environments, a technician, in some examples, may need to uninstall certain remote sensing devices and transport the remote sensing device to an area specifically designated for undergoing a stationary calibration process, for example, in a stationary laboratory designated for calibration or in some examples, various development testing. In an illustrative example, a remote sensing device may be uninstalled from an aircraft and transported to a laboratory in which a calibration of the remote sensing device may occur in a controlled laboratory environment commissioned specifically for calibrating such remote sensing devices.

The process of removing remote sensing devices in the context of certain fields to perform a calibration, however, can constitute a significant burden on personnel and may impose a burden on the overarching system as a whole. In some examples, removing such sensing devices may involve strict adherence to access control procedures, in addition to the proper alignment of various operating schedules and other coordination tasks, such as the prompt procurement of replacement sensing devices that have been previously calibrated in a laboratory or other development environment. In addition, a designated calibration environment for the sensing device may not be readily available, and thus, the burden on the system in which the sensing device is configured to operate may be even higher, where uncalibrated sensing devices may potentially become unusable if the remote sensing device cannot be feasibly recalibrated within a particular timeframe.

The aforementioned problems, among others, may be addressed by the remote calibration techniques of this disclosure. In particular, a calibration device is disclosed that is configured to communicate wirelessly with a remote sensing device while the remote sensing device remains affixed to a particular structure (e.g., a vehicle, building, home, etc.). The remote sensing device may be affixed to the structure in a permanent or semi-permanent installation. In an example, the remote sensing device may be commissioned for installation in a particular structure and thus, may become affixed to the structure. The calibration device may include a handheld device that includes one or more calibrated sensors configured to measure one or more parameters of an environment. The calibration device may be used to calibrate the remote sensing device. In an example, the calibration device may communicate measurement data to the remote sensing device that the calibration device determines is relevant to the remote sensing device, such as by determining one or more parameters that the remote sensing device is ordinarily configured to measure in a commissioned state, such as a state where the remote sensing device is in use or is in a condition for use in the overarching system.

In an illustrative example, the calibration device may be configured to calibrate a remote sensing device by first sensing measurement data related to one or more parameters that the remote sensing device is configured to measure. In turn, the calibration device may wirelessly communicate the measurement data to the remote sensing device. In this way, the calibration device may signal to the remote sensing device measurement data that a calibrated sensing device should be sensing in the environment.

In some examples, the calibration device may perform a multi-stage calibration process. In an illustrative example, the calibration device may implement a multi-stage sensor calibration process by being utilized in environments, such as at cruising altitude for an aircraft to obtain a relatively low-level sample, and during ground operations to receive high levels that are higher relative to the low-level sample obtained at the cruising altitude or some other altitude. As described herein, the calibration device may communicate the various sets of measurement data to the remote sensing device in order to perform the one or more various calibration process techniques of this disclosure.

In any case, the calibration device may communicate the measurement data to the remote sensing device via a wireless link while the remote sensing device advantageously remains affixed to a structure configured to house the remote sensing device.

In addition, the remote sensing device may determine that measurement data sensed by the remote sensing device does not coincide with the measurement data received from the calibration device. That is, the remote sensing device may determine a discrepancy between the measurement data from both devices that indicates the remote sensing device is not measuring data within a predefined degree of measuring accuracy. In such instances, the remote sensing device may then automatically adjust various transform settings of the remote sensing device (e.g., calibration offset settings, sensor hardware settings, etc.). As such, the remote sensing device may apply the one or more adjusted transform settings to then sense measurement data that properly coincides with the measurement data received from the calibration device. In such examples, the remote sensing device may be configured to adjust internal settings such that the remote sensing device senses measurement data that aligns with measurement data received from the calibration device. In some examples, the remote sensing device may control the alignment to achieve a predetermined degree of accuracy as determined from a comparison of the measurement data received from the calibration device and the measurement data obtained via one or more sensors of the remote sensing device. In such examples, the remote sensing device may adjust various calibration settings to satisfy a predefined calibration threshold without detaching from the structural environment in which the remote sensing device is commissioned to operate.

FIG. 1 is a conceptual block diagram depicting an example calibration device 10, in accordance with aspects of this disclosure. In the illustrated example, calibration device 10 includes processing circuitry 12, communication circuitry 14, sensing circuitry 16, and storage device 20. In some examples, calibration device 10 may include an optional user interface (UI) 24.

In some examples, calibration device 10 may be implemented as a portable device. In such examples, calibration device 10 may house one or more components (e.g., processing circuitry 12, etc.) within an enclosure housing (not shown). In some examples, one or more components of calibration device 10 may be implemented outside of the enclosure housing. In an example, calibration device 10 may include a user interface 24 implemented as a touch screen that is located on the outside of the enclosure housing. In some examples, calibration device 10 may be implemented as a handheld device. That is, calibration device 10 may be of a size and weight that allows the calibration device 10 to be transported or carried around by a user, such as a technician, a maintenance personnel, a mechanic, etc. In some examples, calibration device may be configured for personal in-home use, where the calibration device 10 may be a handheld device of an end-user customer.

Calibration device 10 may, in some examples, be implemented as a standalone device. In another example, calibration device 10 may be implemented as a device that interfaces with another portable device, such as a so-called smartphone, laptop computer, tablet computer, etc. In an illustrative example, calibration device 10 may be implemented as part of an electronic flight bag (EFB), which may be implemented on a tablet computer or analogous user interface device. In such examples, calibration device 10 may be implemented to operate in conjunction with a wide variety of user interface devices (e.g., via a wireless link) or may be implemented as a self-contained unit, such as where calibration device 10 includes user interface 24 as an integral part of calibration device 10.

In some examples, calibration device 10 may be configured to connect to various user interface devices (not shown) via a communication link, such as a wireless or wired link. In such examples, user interface 24 may be implemented as a device external to calibration device 10. In an example, user interface 24 may be implemented by a separate user interface device. For example, separate user interface devices (not shown) include tablet computers, laptop computers, phones, EFBs, augmented reality headsets or virtual reality headsets, or other types of user interface devices.

Processing circuitry 12 of calibration device 10 may include fixed function circuitry and/or programmable processing circuitry. Processing circuitry 12 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 12 may include multiple components, such as any combination of one or more microprocessors, one or more controllers, one or more DSPs, one or more ASICs, or one or more FPGAs, as well as other discrete or integrated logic circuitry. The functions attributed to processing circuitry 12 herein may be embodied as software, firmware, hardware or any combination thereof.

In the example illustrated in FIG. 1, processing circuitry 12 is configured to perform the various techniques described in FIGS. 4-9. To avoid confusion, processing circuitry 12 is described as performing one or more of the various calibration techniques proscribed to calibration device 10, but it should be understood that these techniques may also be performed by other processing circuitry (e.g., processing circuitry of data server(s) 732 of FIG. 7, etc.). In addition, various techniques of this disclosure may be performed in tandem with processing circuitry of other devices (e.g., processing circuitry 86 of remote sensing device 80 of FIG. 3). In an example, remote sensing device 80 may receive measurement data 21 from calibration device 10 and calibrate sensor data of the remote sensing device 80 based upon measurement data 21 received from calibration device 10. In some examples, remote sensing device 80 may, in turn, transmit measurement data, or other calibration data (e.g., a calibration confirmation status), to calibration device 10.

Figure 2:
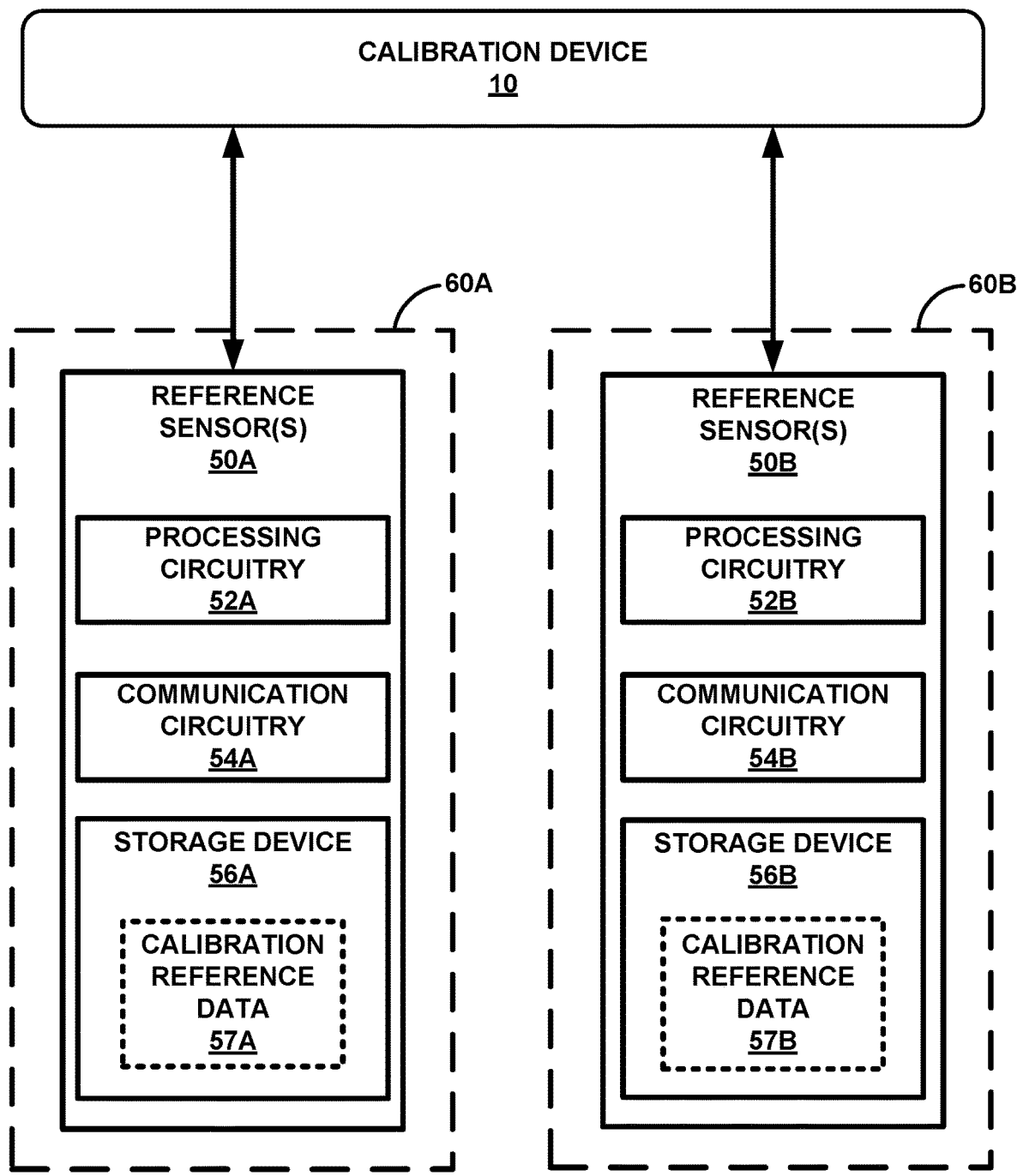
FIG. 2 is a conceptual block diagram depicting the example calibration device of FIG. 1 and a set of reference sensors, in accordance with aspects of this disclosure.
Figure 3:
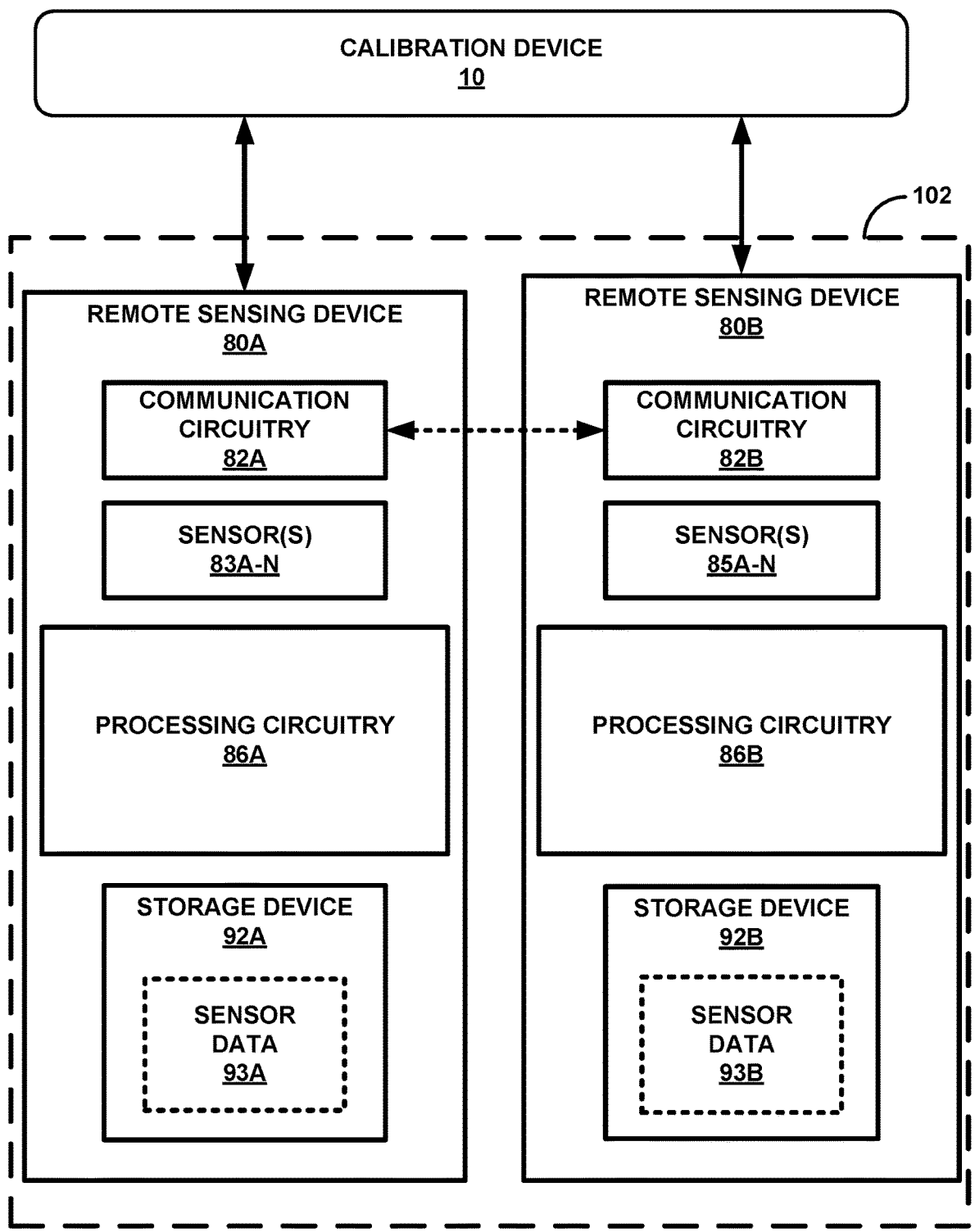
FIG. 3 is a conceptual block diagram depicting the example calibration device of FIG. 1 and a set of remote sensing devices, in accordance with aspects of this disclosure.

Communication circuitry 14 may include any suitable hardware, firmware, software or any combination thereof for communicating with another device, such as a sensing device (e.g., reference sensor(s) 50 of FIG. 2, remote sensing device(s) 80 of FIG. 3), a network computing device, or another device configured for wireless or wired communication links. Under the control of processing circuitry 12, communication circuitry 14 may receive downlink telemetry from, as well as send uplink telemetry to a sensing device or another device with the aid of an internal or external antenna, e.g., antenna 15. In addition, processing circuitry 12 may communicate with a networked computing device via communication circuitry 14 and a computer network (e.g., network 730 described with reference to FIG. 7). In some examples, communication circuitry 14 may include a wireless network interface card (WNIC) or other type of communication module. In some examples, communication circuitry 144 may have an Internet Protocol (IP) port coupled to an ethernet connection or to an output port, such that communication circuitry 14 receives outputs from processing circuitry 12. Communication circuitry 14 may be configured to connect to a Wi-Fi™ or other wireless network connection.

Antenna 15 and communication circuitry 14 may be configured to transmit and/or receive signals via inductive coupling, electromagnetic coupling, near-field communications, RF communication, Bluetooth®, Wi-Fi™, or other proprietary or non-proprietary wireless communication schemes. For example, processing circuitry 12 may provide data to be uplinked to a remote sensing device via communication circuitry 14 and via control signals using an address/data bus. In some examples, communication circuitry 14 may provide the received data to processing circuitry 12 for processing. In some examples, communication circuitry 14 may provide data to processing circuitry 12 via a multiplexer.

Calibration device 10 may include one or more reliable sensors 18A or 18B (referred to in some instances as simply sensors 18 or sensor 18 where appropriate). In such examples, sensors 18 of calibration device 10 are termed reliable in the sense that the sensors have calibrations that are traceable to primary standards from the National Bureau of Standards (NBS), National Physical Laboratory (NPL), or other recognized sources for generation of primary standards (sometimes referred to as "traceable calibrations"). In addition, when placed in the same environment with a remote sensing device, calibration device 10 may provide a data output that the remote sensing device can rely on when received, to determine whether there is a data offset. If an offset is detected, the remote sensing device may correct the sensor output to align with data received from the calibrated device.

As such, calibration device 10 may include internal sensor(s) 18A. In some examples, calibration device 10 may additionally, or alternatively, interface with external sensor(s) 18B. Sensor(s) 18 (internal or external to calibration device 10) may sense measurement data 21 of an environment. In an illustrative and non-limiting example, sensor(s) 18 may obtain a sample of air from an environment. Calibration device 10 may determine measurement data 21 based on the sample of air via sensor(s) 18 sensing contaminants in the sample of air. Calibration device 10 may store measurement data 21 to storage device 20. Internal sensor(s) 18A may include pressure sensors, temperature sensors, altitude sensors, humidity sensors, air quality sensors, optical sensors, accelerometers, etc. As described with reference to FIG. 2, calibration device 10 may initially calibrate internal sensor(s) 18A to a particular calibration standard prior to serving as a calibration device for calibrating remote sensing device(s) 80.

In another example, calibration device 10 may be configured to optionally interface with external sensor(s) 18B. In some examples, external sensor(s) 18B may include a remote sensing device, such as the remote sensing device(s) 80 described with reference to FIG. 3. However, while external sensor(s) 18B may, in some examples, be remote sensing devices, external sensor(s) 18B may include sensors that have already been calibrated using a primary or secondary calibration standard. That is, external sensor(s) 18B of calibration device 10 may not include the particular remote sensing devices that are currently being calibrated by calibration device 10. In an example, external sensor(s) 18B, such as one of a calibrated remote sensing device 80 or another sensing device, may be a portable or modular sensing device that has been calibrated within a predefined period of time of the calibration device 10 calibrating another sensing device.

In an illustrative example, calibration device 10 may calibrate a first remote sensing device 80 (e.g., a first external sensor 18B) in an environment. The calibration device 10 may thus, subsequently receive data from the calibrated first remote sensing device 80 via communication circuitry 14 when calibrating a subsequent remote sensing device 80 in the same environment (e.g., the cabin of an aircraft) or a neighboring environment (the cabin of a neighboring aircraft). In another example, calibration device 10 may determine that a first remote sensing device 80 is already calibrated. In such examples, calibration device 10 may receive measurement data from the first remote sensing device 80 as calibration device 10 calibrates another remote sensing device 80 in the environment. In an illustrative example, calibration device 10 may receive, via communication circuitry 14, from a first calibrated remote sensing device 80 in the environment measurement data indicating a pressure measurement parameter. As such, calibration device 10 may use the pressure measurement data to determine another parameter measurement, such as an air quality parameter, and utilize the parameter measurement to calibrate a second remote sensing device 80.

Sensing circuitry 16 may include signal conditioning circuitry, such as signal amplifiers, signal filters, analog-to-digital converters (ADC), etc. In addition, sensing circuitry 16 may include switching circuitry that selectively couples sensing circuitry 16 to a selected sensor 18 of calibration device 10. Processing circuitry 12 may determine which sensor(s) 18 to couple to sensing circuitry 16 based on an identification of the remote sensing device 80 that is the subject of a particular calibration. In an illustrative example, signals from a selected sensor 18 may be selected for coupling to a wide-band amplifier and as such, sensing circuitry 16 may provide such signal to a multiplexer. The signals may then be converted to multi-bit digital signals by an ADC. As such, processing circuitry 12 may store the digital signal to storage device 20 as part of measurement data 21.

In such examples, calibration device 10 may be configured to sense measurement data 21 related to a single measurement parameter or to multiple measurement parameters. In addition, the type or quantity of sensors 18 included as part of calibration device 10, or that may interface with calibration device 10, may be based on the specific requirements of a calibration procedure (e.g., type of remote sensing device being calibrated, type of sensors employed by a given remote sensing device).

In some examples, calibration device 10 may not include internal sensors 18A and may instead only include sensing circuitry 16 and/or communication circuitry 14. As such, calibration device 10 may not sense measurement data directly but instead may receive measurement data from external sensor(s) 18B. In such examples, calibration device 10 may receive, via sensing circuitry 16 and/or communication circuitry 14, digitized measurement data and/or an analog measurement signal from one or more of external sensor(s) 18B. In example involving calibration device 10 receiving an analog measurement signal, calibration device 10 may convert the analog measurement signal to digital measurement data. In some examples, calibration device 10 may cross-check the calibration settings of calibration device 10 by comparing the digital measurement data following the conversion to calibration reference data (e.g., calibration reference data 57 of reference sensor(s) 50 of FIG. 2) to determine whether calibration device 10 is properly calibrated to a certain calibration standard.

In some example, calibration device 10 may include one or more sensor port(s) 17 configured to connect external sensor(s) 18B to calibration device 10. In this way, calibration device 10 may be used as a modular calibration device that can port different types of sensors 18 depending on the specific requirements of a particular calibration procedure. As such, calibration device 10 may receive measurement data from external sensor(s) 18B via sensor port(s) 17 and/or wirelessly via communication circuitry 14.

In some examples, storage device 20 includes computer-readable instructions that, when executed by processing circuitry 12, cause calibration device 10 and processing circuitry 12 to perform various functions attributed to calibration device 10 and processing circuitry 12 herein. Storage device 20 may include any volatile, non-volatile, magnetic, optical, or electrical media. For example, storage device 20 may include random access memory (RAM), read-only memory (ROM), non-volatile RAM (NVRAM), electrically-erasable programmable ROM (EEPROM), erasable programmable ROM (EPROM), flash memory, or any other digital media. Storage device 20 may store, as examples, programmed values for one or more operational parameters of calibration device 10 and/or measurement data collected by calibration device 10 for transmission to another device using communication circuitry 14. Data stored by storage device 20 and transmitted by communication circuitry 14 to one or more other devices may include measurement data 21 and/or device calibration data 22, as examples.

In some examples, storage device 20 may include one or more of datastores. For example, storage device 20 may include any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extensible markup language (XML) files, TeXT (TXT) files, flat files, spreadsheet files, and/or any other widely used or proprietary format for data storage. In some examples, storage device 20 may include executable instructions that when executed cause processing circuitry 12 to execute various techniques of this disclosure.

In some examples, measurement data 21 includes measurement values, transforms (e.g., calculations, formulas), calculation settings (e.g., transform coefficients for a calculation, slope parameters, intercept parameters, etc.). In an example, measurement data 21 may include measurement values obtained via sensor(s) 18. In addition, measurement data 21 may include sensor data received from remote sensing device(s) 80. In such examples, measurement data 21 may include data indicating a condition of remote sensing device 80 prior to a current calibration process, a calibration offset of the remote sensing device 80, and whether further sensor maintenance may be required for the specific sensor location, etc.

In some examples, calibration device 10 may include a traceable measuring device. As such, calibration device 10 may store device calibration data 22 to storage device 20. Device calibration data 22 may include tracing data for calibration device 10 that allows another device to verify that calibration device 10 is calibrated to a predefined standard (e.g., a primary calibration standard). In some examples, the tracing data may include timing or historical data for the calibration of calibration device 10. The tracing data may further include which reference sensor(s) 50 were used to calibrate calibration device 10, the calibration reference data that was received from reference sensor(s) 50, an estimated drift rate of calibration device 10, certificate authorization data, etc. In an example, calibration device 10 may be certified with authorization data indicating that the calibration device 10 is authorized to calibrate one or more particular types of sensors. In some examples, calibration device 10 may transmit the authorization data to a remote sensing device 80. The remote sensing device 80 may determine from the authorization data whether calibration device 10 is authorized to calibrate one or more sensors of the remote sensing device 80. In some instances, calibration device 10 may be authorized to calibrate certain sensors for a limited period of time following calibration of calibration device 10. In an example, device calibration data 22 may define a time limit for when calibration device 10 may not be able to calibrate remote sensing device(s) 80, in which case calibration device 10 may undergo a recalibration procedure.

In addition, calibration device 10 may include a transfer standard device that is calibrated via a primary standard device (e.g., via reference sensor(s) 50 of FIG. 2). As a transfer standard device, calibration device 10 may effectively transfer the calibration standard to remote sensing device(s) 80 as a secondary standard. The calibration standard may be considered a secondary standard by virtue of the calibration being at least twice removed from the primary calibration standard used to calibrate calibration device 10. A calibration standard, for example, may be assigned to the particular sensing device by a relevant regulatory authority, original equipment manufacturer (OEM) customer, or other entity. In any case, calibration device 10 may calibrate a remote sensing device by communicating measurement data to a remote sensing device via communication circuitry 14, thereby effectively transferring the primary standard to the remote sensing device as a secondary standard.

In some examples, calibration device 10 may include a user interface (UI) 24. User interface 24 may be an integral part of calibration device 10. In another example, calibration device 10 may interface with a separate user interface device that includes user interface 24. In such examples, calibration device 10 may receive user input via user interface 24. In examples where user interface 24 is not an integral part of calibration device 10, calibration device 10 may nevertheless receive user input via user interface 24 through a wired or wireless link that connects calibration device 10 to the separate user interface device that includes user interface 24.

In some examples, user interface 24 may be split across devices. In an example, calibration device 10 may include a first part of user interface 24 and a separate user interface device may include a second part of user interface 24. In an illustrative and non-limiting example, calibration device 10 may include buttons, keys, triggers, or a touch interface that signal various operational commands to processing circuitry 12, such as a trigger that signals to processing circuitry 12 to initiate measuring sensed data via sensor(s) 18. In addition, a separate user interface device, such as an EFB, may include a display screen interface that allows a user to interact with calibration device 10 or otherwise monitor the operational status of calibration device 10, such as to monitor whether calibration device 10 is currently obtaining measurement data or if calibration device 10 is instead in a standby mode.

In some examples, user interface 24 may provide a calibration interface 25. The calibration interface 25 may include a graphical user interface (GUI) that allows a user to visualize the various remote sensing device(s) 80 and interact with the remote sensing device(s) 80 via calibration interface 25. Calibration interface 25 may provide an option to interrogate one or more remote sensing device(s) 80. When a user selects the option, calibration interface 25, via communication circuitry 14, may interrogate a remote sensing device 80 to retrieve sensor data from the remote sensing device 80. As such, calibration interface 25 may cause a remote sensing device to transfer sensor data to calibration device 10, such as a calibration log data for the remote sensing device, measurement data that the remote sensing device has sensed over time, etc.

In some examples, calibration interface 25 may include a camera (not shown) or other input device. In some examples, calibration device 10 may obtain, via calibration interface 25, a quick response (QR) code, barcode data, radio-frequency identification (RFID) data, etc. that identifies a particular remote sensing device 80. In an example, calibration device 10 may scan a QR code, barcode, or other identifier for a remote sensing device 80 that is the subject of the instant calibration process. In such examples, calibration device 10 may identify remote sensing device(s) 80 by the identification data and may further identify additional sensor data 93 of FIG. 3 regarding each remote sensing device 80 (e.g., number of sensors 83 in FIG. 3, type of sensors, calibration history, etc.). Calibration device 10 may be configured to obtain such identification data when the calibration device 10 satisfies a distance threshold relative to the particular remote sensing device 80. In an example, remote sensing device 80 may be configured to transmit the identification data to calibration device 10 when the calibration device 10 is within a predetermined proximity distance of the remote sensing device 80 as determined from the distance threshold.

In some examples, the camera may be configured to obtain identification data from one or more of remote sensing device(s) 80 of FIG. 3. The identification data may include sensor identification data (e.g., serial numbers, etc.) or in some instances, location identification data (e.g., GPS coordinates identifying a location of calibration device 10).

In some examples, calibration device 10 may include a global position system (GPS) location detector. In addition, remote sensing devices 80 may also include location detectors (e.g., GPS) to ensure calibration device 10 is within a specified boundary of one or more sensors 83 prior to calibration device 10 performing the calibration process of respective remote sensing devices 80. In some examples, calibration device 10 may communicate measurement data with a first remote sensing device 80A in a first environment 102 (e.g., a first building, a first vehicle), as well as communicate measurement data with a second remote sensing device (not shown) in another environment 102 (e.g., a second building, a second vehicle, etc.). In an illustrative and non-limiting example, calibration device 10 may be configured to calibrate sensors for multiple aircraft concurrently, where the aircraft are adjacent to one another as determined from the GPS data. In such examples, calibration device 10 may be configured to calibrate sensors 83 where the sensors are within a same threshold region as calibration device 10 as further determined from the GPS data of remote sensing devices 80 and calibration device 10. Based on the GPS location of calibration device 10 and sensors 83 that calibration device 10 is configured to calibrate, calibration device 10 may calibrate particular sensors 83 that are configured to receive calibration measurement data from calibration device 10 in accordance with one or more of the various calibration techniques of this disclosure when the distance between calibration device 10 and remote sensing device 80 satisfies a predefined threshold distance as determined from the GPS data of each respective device.

Although described with reference to GPS sensing as one way to ensure the sensors are physically within the same zone, the techniques of this disclosure are not so limited and a person skilled in the art will understand that various different methods may be employed for this purpose. In another example, prediction algorithms could similarly evaluate the location of calibration device 10 and ensure calibration device 10 is within a certain proximity, such as 20 meters, of remote sensing device 80A, remote sensing device 80B, or another remote sensing device of another environment, such as another building or vehicle (not shown in the example of FIG. 3). Advantageously, when a plurality of aircraft are parked adjacent, for example, calibration device 10 may calibrate the plurality of aircraft simultaneously. Calibration device 10 may do so based on a mathematical assumption that the remote sensing devices 80 are, for example, in generally the same atmospheric contaminant boundary (e.g., both on the ground in a similar gate area, neighborhood location, etc.).

In some examples, calibration device 10 may simultaneously obtain measurement data via one or more of sensor(s) 18 at the time calibration device 10 obtains the identification data from sensing device(s) 80. In this way, calibration device 10 may be performing the calibration process while in proximity to the remote sensing device that calibration device 10 is calibrating.

FIG. 2 is a conceptual block diagram depicting the example calibration device 10 of FIG. 1 and a set of reference sensor(s) 50A-50B, in accordance with aspects of this disclosure. Calibration device 10 may be configured to be calibrated in a development environment 60, such as a laboratory environment or another non-field environment. Reference sensor(s) 50A and 50B may each include one or more sensors located in respective fixed development environments 60. In such examples, calibration device 10 may perform a self-calibration of various sensors 18 of calibration device 10 in various different environments 60. In some examples, environments 60 may represent distinct and separate locations, such as different laboratories. As such, calibration device 10 may calibrate a first sensor 18 in a first environments 60A (e.g., a first laboratory environment, a first development environment, etc.) and may calibrate a second sensor 18 in a second environment 60B (e.g., a second laboratory environment, a second development environment, etc.). In this way, calibration device 10 may collect and store multiple transfer standards over time for calibrating various different sensors. In some examples, calibration device 10 may deploy the multiple transfer standards in a single production environment (e.g., field environment) at a later point in time in order to calibrate the various different sensors in the production environment. In an illustrative example, the single production environment may include the inside of a vehicle or other structure, the environment surrounding the vehicle or other structure, or both.

In some examples, calibration device 10 may be configured to conduct a self-calibration procedure. In such examples, calibration device 10 may self-calibrate based on measurement data or measurement signal representations received from reference sensor(s) 50. Calibration device 10 may receive such information from reference sensor(s) 50 via communication circuitry 54. In some examples, the self-calibration procedure may be similar to that of the calibration procedure employed for calibrating remote sensing device(s) 80 described herein. In an example, calibration device 10 may receive measurement data from reference sensor(s) 50. The measurement data may signal to calibration device 10 a value of a parameter that calibration device 10 should be sensing. In response to receiving the measurement data from reference sensor(s) 50, calibration device 10 may adjust various parameter settings to compensate for a calibration offset and may store the adjusted parameter settings to storage device 20 as measurement data 21. Calibration device 10 may further store a summary log detailing the self-calibration procedure as device calibration data 22 for future reference by another device. As such, calibration data 22 of calibration device 10 may include the summary log.

In addition, reference sensor(s) 50 may include storage devices 56. Reference sensor(s) 50 may store calibration reference data 57 to storage devices 56. Calibration reference data 57 may include information regarding the calibration of reference sensor(s) 50. Reference sensor(s) 50 may transfer calibration reference data 57 to calibration device 10. Calibration device 10 may determine, from calibration device 10, whether reference sensor(s) 50 are calibrated according to a primary calibration standard and that the calibration is still valid within the timeframe of calibrating calibration device 10. When calibration device 10 determines from calibration reference data 57 that reference sensor 50 represent a calibrated reference sensor, calibration device 10 may proceed with updating a secondary calibration standard of calibration device 10, such as a transform setting or other parameter setting of calibration device 10.

In some examples, communication circuitry 54 may receive a first set of measurement data and a measurement-signal representation from reference sensor(s) 50. Calibration device 10 may then perform a transform on the measurement signal and compare the transformed measurement signal to the first set of measurement data received from reference sensor(s) 50. Calibration device 10 may then perform a self-calibration to compensate for any offsets detected between the transformed measurement signal and the measurement data.

The processing circuitry 52 of reference sensor(s) 50 may be configured to facilitate the various processes involved in calibrating calibration device 10 based on reference sensor(s) 50. In an example, processing circuitry 52 may transmit, via communication circuitry 54, measurement data to calibration device 10. It will be understood that analogous components of reference sensor(s) 50 may be of a similar configuration to that of calibration device 10. In an example, processing circuitry 52 may include any one or more of a microprocessor, a controller, a DSP, an ASIC, a FPGA, or equivalent discrete or analog logic circuitry, similar to that of processing circuitry 12 of calibration device 10.

FIG. 3 is a conceptual block diagram depicting calibration device 10 of FIG. 1 and a set of remote sensing devices 80A-80B, in accordance with aspects of this disclosure. The remote sensing devices 80 are located in a production environment 102. In an example, the production environment 102 may be a building, an aircraft, a watercraft, a spacecraft, etc., or an environment within one of the aforementioned structures. Production environment 102 may include multiple different types of remote sensing devices 80 in the production environment 102. In any case, calibration device 10 may calibrate remote sensing devices 80 in any number of different environments 102 (e.g., building, aircraft, house, or other structure). In addition, environment 102 may include an internal environment and/or an external environment relative to the structure.

As used herein, a "remote" sensing device 80 generally refers to a sensing device that is remote or separate from calibration device 10 during normal operation of the sensing device 80. That is, calibration device 10 is not affixed or otherwise specifically assigned to sense the parameters of any particular environment and instead, may be transported to different environments to calibrate sensors in that environment. As described herein, calibration device 10 may include and/or calibrate multiple different sensors 18 across multiple different environments 60 and in turn, may calibrate corresponding sensors 83 in a single production environment, where the single production environment includes each remote sensing device 80 that corresponds to the multiple different calibrated sensors 18.

In the context of a vehicle environment for illustration purposes, calibration device 10 may have no specific relationship to vehicle, whereas remote sensing device 80 may have a specific relationship to the vehicle in the sense that remote sensing device 80 is configured to measure parameters of the vehicle and within the specific vehicle. In this context, calibration device 10 may be transported to the remote location, such as a building, vehicle, or other structure to perform a remote sensor calibration and may likewise subsequently be transported away from the remote location following the remote sensor calibration of remote sensing device 80. As such, the sensing device is a remote sensing device 80 and is configured to be calibrated remotely by calibration device 10.

In some examples, the measurement capabilities of certain remote sensing devices 80 may drift over time, such as after having been in operation in the field for a period of time. In another example, the remote sensing device may be prepared for installation in the field, such as in a production environment, but may not have been calibrated yet in accordance with a calibration standard. As such, the remote sensing device 80 may output or begin to output unreliable, inaccurate, or otherwise faulty measurement information that an overarching system may continue to reference when performing certain actions.

In some examples, an overarching system, such as an environmental control system (ECS) or a measurement instrument that includes remote sensing device 80, may rely upon the measurement information when performing certain operations or when monitoring the health of a system. As a result of drift in measurement capabilities or in the case of an uncalibrated sensor, such overarching systems could potentially rely on faulty measurement information when performing system level tasks. In an illustrative example, an uncalibrated remote sensing device may cause the system to incorrectly trigger or not trigger an alarm or incorrectly signal a fault or mistakenly not signal a fault. In addition, remote sensing device 80 may be configured to obtain a variety of sensor readings, where the sensor readings may at times be inaccessible for a control system to verify that remote sensing device 80 is outputting sensor readings within an expected measurement range. In such examples, remote sensing device 80 must be calibrated to avoid such unintended consequences. In some examples, remote sensing devices 80 may enter an automatic calibration mode. However, automatic calibration modes can result in further problems, such as when fixed-calibration cycles trigger corrections to components of the remote sensing device 80, which can make output from remote sensing device 80 worse, rather than better, as mistakes encountered in a fixed-calibration cycle may promulgate through the rest of the system or even internally within remote sensing device 80.

In accordance with one or more of the various techniques of this disclosure, calibration device 10 may perform a remote calibration of remote sensing devices 80 in environment 102. Calibration device 10 may obtain measurement values (e.g., measurement data 21) that corresponds to one or more of remote sensing devices 80. In addition, calibration device 10 may obtain measurement data 21 that corresponds to individual sensors 83A-N of remote sensing devices 80, such as where one remote sensing device includes multiple sensor(s) 83A-N.

Calibration device 10 may transmit, via a wireless link, the one or more measurement values to one of remote sensing devices 80. Calibration device 10 may perform the remote calibration while the remote sensing device 80 is affixed to the structure. In other words, calibration device 10 may perform the remote calibration while remote sensing device 80 remains associated with the structure so as to be permanently or semi-permanently fixed to the structure. In some examples, remote sensing device 80 may be housed within the structure during the remote calibration. If the remote calibration is successful, remote sensing device 80 may remain affixed to the structure following the calibration. The remote sensing device 80 may perform a calibration adjustment according to the one or more measurement values received from calibration device 10. Following the remote calibration, calibration device 10 may receive a confirmation signal from remote sensing device 80 indicating that an adjustment to remote sensing device 80 has occurred.

In an illustrative example, remote sensing device 80 may include an air quality sensor. The air quality sensing device may be configured to sense air quality measurement data in the cabin of a vehicle, such as of an aircraft, or in another environment of another structure, such as a building. In a non-limiting example, remote sensing device 80A may include a fielded gas sensor (e.g., a gas sensor in a production environment) configured to measure gas concentration levels in the cabin of a particular aircraft. Remote sensing device 80B may include a fielded particle sensor configured to measure particle count and/or particle size in the cabin of the particular aircraft. Calibration device 10 may identify each of remote sensing device 80A and remote sensing device 80B and calibrate both from within the environment of the remote sensing devices 80. Calibration device 10 may do so by sensing and transmitting a first set of corresponding measurement values to remote sensing device 80A and sensing and transmitting a second set of corresponding measurement values to remote sensing device 80B.

In some examples, remote sensing devices 80 may rely on measurement readings from one or more internal sensors 83A-N to determine a corresponding parameter, such as an air quality parameter. In the example of an air quality sensing device, the internal sensors 83 may include, in addition to an air quality sensor, one or more air quality compensation sensors 83, such as a humidity sensor, temperature sensor, and/or pressure sensor. In such examples, remote sensing device 80 may combine measurement data obtained from compensation sensors 83 to determine a specific air quality parameter or multiple air quality parameters, such as one or more parameters indicative of particle count, particle mass, carbon dioxide levels, carbon monoxide levels, particle size, volatile organic hydrocarbon levels, etc. Processing circuitry 86 may utilize an equation that transforms an input air quality signal to an output air quality signal, where the equation includes transforming the signals using compensation parameters that are based on measurement data obtained from one or more of the compensation sensors (e.g., humidity data, temperature data, pressure data, etc.).

In some examples, remote sensing devices 80 may communicate with one another via communication circuitry 82. In an example, remote sensing device 80A may receive measurement data from calibration device 10 and calibrate based on the measurement data. Instead of calibrating remote sensing device 80B separately, calibration device 10 may signal to remote sensing device 80A to transmit a copy of the measurement data obtained via calibration device 10 to remote sensing device 80B and to transmit a second set of measurement data obtained via remote sensing device 80A to remote sensing device 80B. Remote sensing device 80B may calibrate (e.g., self-calibrate) based on a comparison of measurement data obtained via sensors 85 of remote sensing device 80B and the measurement data obtained via remote sensing device 80B. In other words, calibration device 10 may calibrate, via communication circuitry 14, a first remote sensing device 80A, which may, in turn, calibrate, via communication circuitry 82A, a second remote sensing device 80B that is analogous to the first remote sensing device 80A. In such examples, calibration device 10 may transmit measurement data 21, via communication circuitry 14, to the first remote sensing device 80A and/or the second remote sensing device 80B, and in addition, the first remote sensing device 80A may transmit measurement data of the first remote sensing device 80A to the second remote sensing device 80B. Remote sensing device 80A or remote sensing device 80B may perform a self-calibration based on data received from a respective transmitting device.

In an illustrative example, calibration device 10 may have an acceptable range of 20 meters for calibrating a remote sensing device 80A. Calibration device 10 may be 20 meters from a first remote sensing device 80A that may, in turn, be 10 meters from a second remote sensing device 80B. Calibration device 10 may then be 30 meters from the second remote sensing device 80B and thus, technically out-of-range for calibrating the second remote sensing device 80B (e.g., as determined from GPS data). However, calibration device 10 may calibrate first remote sensing device 80A which may, in turn, calibrate the far second remote sensing device 80B in a similar manner because the second remote sensing device 80B is within calibration range of the first remote sensing device 80A. That is, the first remote sensing device 80A may sense a measurement value following the calibration via calibration device 10 and then may transmit measurement data that is based on the measurement value to various other remote sensing device within range of the first remote sensing device 80A, where those other remote sensing devices may perform a self-calibration based on the measurement data received from the first remote sensing device 80A.

In some examples, the farthest remote sensing device 80 (e.g., a daisy-chained sensor) may only accept the calibration data from calibration device 10 (e.g., indirectly from calibration device 10 via another remote sensing device 80) if the value from calibration device 10 relayed to the farthest remote sensing device 80 is within a predefined tolerance. In another example, the farthest remote sensing device 80 may accept the calibration data from calibration device 10 regardless of any tolerance threshold being satisfied.

In an example involving tolerance thresholds, a first remote sensing device 80A may transmit (e.g., relay) calibration data received from calibration device 10 to a second remote sensing device 80B if the difference between what first remote sensing device 80A was originally sensing is within a predefined threshold of the measurement values received from calibration device 10. If the difference is substantial (e.g., more than the predefined threshold amount), calibration device 10 may not cause first remote sensing device 80A to relay the calibration data (e.g., measurement values, drift rates, etc.) to second remote sensing device 80B, whereas otherwise calibration device 10 may be configured to cause first remote sensing device 80A to relay the calibration data (e.g., measurement values, drift rates, etc.) to second remote sensing device 80B. In either case, remote sensing device 80A and remote sensing device 80B may be affixed to different vehicles or buildings (e.g., assigned to a particular vehicle serial number, model number, etc.). For example, first remote sensing device 80A associated with a first aircraft and second remote sensing device 80B associated with a second adjacent aircraft, such as adjacent aircraft. Calibration device 10 may identify aircraft or buildings as adjacent when the aircraft or buildings are determined to be within a predefined geofence boundary or other distance threshold defined within environment 102, such as at an airport, on a tarmac, in an airport gate area, in the same square block, or in any other production environment. As described herein, both remote sensing devices 80 may otherwise be part of the same vehicle or building.

Remote sensing devices 80 may include storage devices 92. Storage devices 92 may include sensor data 93. Sensor data 93 may include sensor identification data (e.g., part number, serial number, etc.), calibration data of the sensor (e.g., day and time of last calibration, calibration offset information, drift data), sensor type, and other information about remote sensing device 80. In some examples, remote sensing devices 80 may wirelessly transmit sensor data 93 to calibration device 10. In response, calibration device 10 may wirelessly transmit to sending device 80 measurement data 21 that is relevant to the particular remote sensing device 80 being calibrated. In another example, calibration device 10 may determine from sensor data 93 of remote sensing device 80 that remote sensing device 80 should be replaced. In an example, sensor data 93 may indicate a drift rate for a particular remote sensing device 80 that is higher than a predetermined drift rate threshold. In such examples, calibration device 10 may identify the particular remote sensing device 80 as a faulty sensing device.

It will be understood that analogous components of remote sensing devices 80 may be of a similar configuration to that of calibration device 10 and/or reference sensor(s) 50. In an example, processing circuitry 86 may include any one or more of a microprocessor, a controller, a DSP, an ASIC, a FPGA, or equivalent discrete or analog logic circuitry, similar to that of processing circuitry 12 of calibration device 10 or processing circuitry 52 of reference sensor(s) 50.

As described herein, the disclosed technology, in various examples, relates to a portable calibration device 10 that includes a wireless interface. Calibration device 10 may include a traceable measuring device. Calibration device 10 may be placed in environment 102 that includes remote sensing device 80A, remote sensing device 80B, or both. Calibration device 10 may then be permitted to measure the parameter(s) of interest. Calibration device 10 utilizes the calibrated value or calibration values to calibrate one or more remote sensing devices 80. In an example, calibration device 10 transmits the calibrated value or multiple calibrated values to one or more remote sensing devices 80 wirelessly. Remote sensing device 80A may be affixed to a vehicle, a building, or to another environment. Remote sensing device 80A may use the calibrated value or values as a data correction factor for the wireless remote sensing device 80A reading to correct its data output.

In an example, calibration device 10 may measure parameters in an environment. Calibration device 10 may obtain the measurement data directly from an environment in which the particular sensing device is situated and/or may receive measurement data from another device, such as from a separately calibrated pressure sensor. Calibration device 10 may then transmit, via a wireless link, measurement values to remote sensing device 80A. Based upon the measurement values received from remote sensing device 80A, remote sensing device 80A may then adjust one or more sensors 83 of remote sensing device 80A, adjust transform settings of remote sensing device 80A, or in some instances, may reconfigure hardware for one or more sensors of remote sensing device 80A. In an illustrative example, calibration device 10 may sense data relating to the conditions of the environment 102 of sensing device 80A and may convey the sensed data to remote sensing device 80A. Remote sensing device 80A may then update an internal calibration offset for one or more sensors 83 of remote sensing device 80A.

Figure 4:
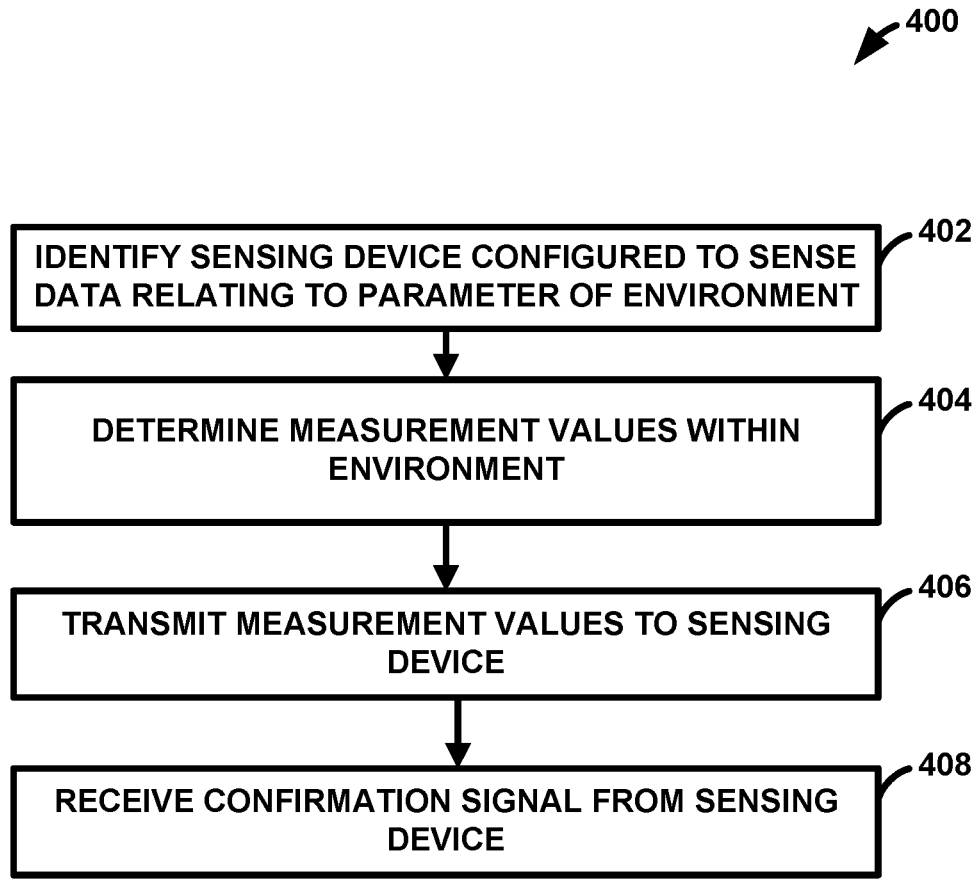
FIG. 4 is a flowchart depicting an example process that the calibration device of FIG. 1 may implement to calibrate the one or more remote sensing devices of FIG. 3, in accordance with aspects of this disclosure.

FIG. 4 is a flowchart illustrating an example process 400 that calibration device 10 may implement for providing remotely calibrating one or more remote sensing device(s) 80, in accordance with illustrative aspects of this disclosure. Process 400 may include some features that may be optional in some examples.

In some examples, calibration device 10 may identify remote sensing device 80A that has been affixed to a vehicle (402). Remote sensing device 80A may have been affixed to the vehicle prior to the calibration device 10 initiating the remote calibration techniques of this disclosure. In such examples, remote sensing device 80A may be linked to the vehicle, assigned to the vehicle, or otherwise still in service to the particular vehicle. The remote sensing device 80A may be physically affixed to the vehicle or by way of a tracing association where remote sensing device 80A, based on information that identifies the specific remote sensing device 80A, can be traced to the vehicle. In some examples, the vehicle comprises an aircraft. In some examples, sensing device 80A may be configured to be physically attached within the aircraft at the time the calibration adjustment of the sensing device 80A occurs.

In some examples, calibration device 10 may determine one or more measurement values within environment 102 (404). The one or more measurement values may relate to the at least one parameter that corresponds to remote sensing device 80A. In an example, remote sensing device 80A may be configured to sense measurement data relating to at least one air quality parameter of environment 102. As such, calibration device 10 may determine one or more air quality measurements in environment 102. In some examples, calibration device 10 may identify remote sensing device 80A in environment 102 by determining the at least one parameter that remote sensing device 80A is configured to sense. Calibration device may then determine the one or more measurement values that relate to the at least one parameter. In an illustrative example, remote sensing device 80A may include the air quality sensor 83A and one or more compensation sensors 83B-N. Compensation sensors 83B-N may include one or more of: an altitude sensor, a pressure sensor, a temperature sensor, or a humidity sensor.

In some examples, calibration device 10 may, when determining the one or more measurement values, determine a first measurement value that relates directly to the at least one parameter and determine a second measurement value that relates indirectly to the at least one parameter, such as a compensation measurement value. In such examples, the second measurement value is separate and distinct from the first measurement value. In an illustrative example, calibration device 10 may obtain the first measurement value from an air quality sensor and obtain the second measurement value from a compensation sensor (e.g., humidity sensor). Calibration device 10 may determine an output measurement value by performing a compensation algorithm using the second measurement value to determine a compensated output value relating to the first measurement value.

In addition, calibration device 10 may transmit, via a wireless link, the one or more measurement values to remote sensing device 80A while remote sensing device 80A is affixed to the vehicle (406). In some examples, calibration device 10 may transmit a first measurement value and a second measurement value to the sensing device, where the first measurement value corresponds to a first parameter and the second measurement value corresponds to a second parameter that is distinct and separate from the first parameter and where the second measurement value relates indirectly to the first parameter. In such examples, calibration device 10 may transmit the compensated output value to the sensing device 80A. In response to receiving such measurement data 21 from calibration device 10, sensing device 80A may adjust various internal settings in order to self-calibrate in view of measurement data 21.

In some examples, calibration device 10 may receive a confirmation signal from the sensing device indicating that an adjustment to the sensing device has occurred (408). In such examples, the adjustment to remote sensing device 80A is configured to occur in accordance with the one or more measurement values. In some examples, the confirmation indicates a time at which the sensing device performed the adjustment. in such examples, processing circuitry 12 may transmit a summary of the confirmation to a network computing device (e.g., via network 730 of FIG. 7). In some examples, calibration device 10 may determine a drift rate of remote sensing device 80A. In such examples, the summary of the confirmation may indicate the drift rate. That is, the summary of the confirmation may indicate the rate at which an output of remote sensing device 80A is drifting relative to a calibration offset.

In some examples, the calibration may not be successful. In an illustrative example, calibration device 10 may identify a second remote sensing device 80B of the vehicle for calibration. Calibration device 10 may transmit a second set of measurement values to the second sensing device 80B. Calibration device 10 may receive sensor data 93 from the second sensing device 80B. In some examples, sensor data 93 may indicate a discrepancy with a calibration of the second sensing device 80B. As such, second sensing device 80B or calibration device 10 may output a summary of the sensor data 93 relating to the second sensing device 80B. The summary may provide an estimate as to why the calibration of second sensing device 80B was not successful. In an example, calibration device 10 may output, via a computing network, a summary of the calibration data relating to the second sensing device 80B, such that the calibration of sensing device 80B or lack thereof may be properly traced.

Figure 5:
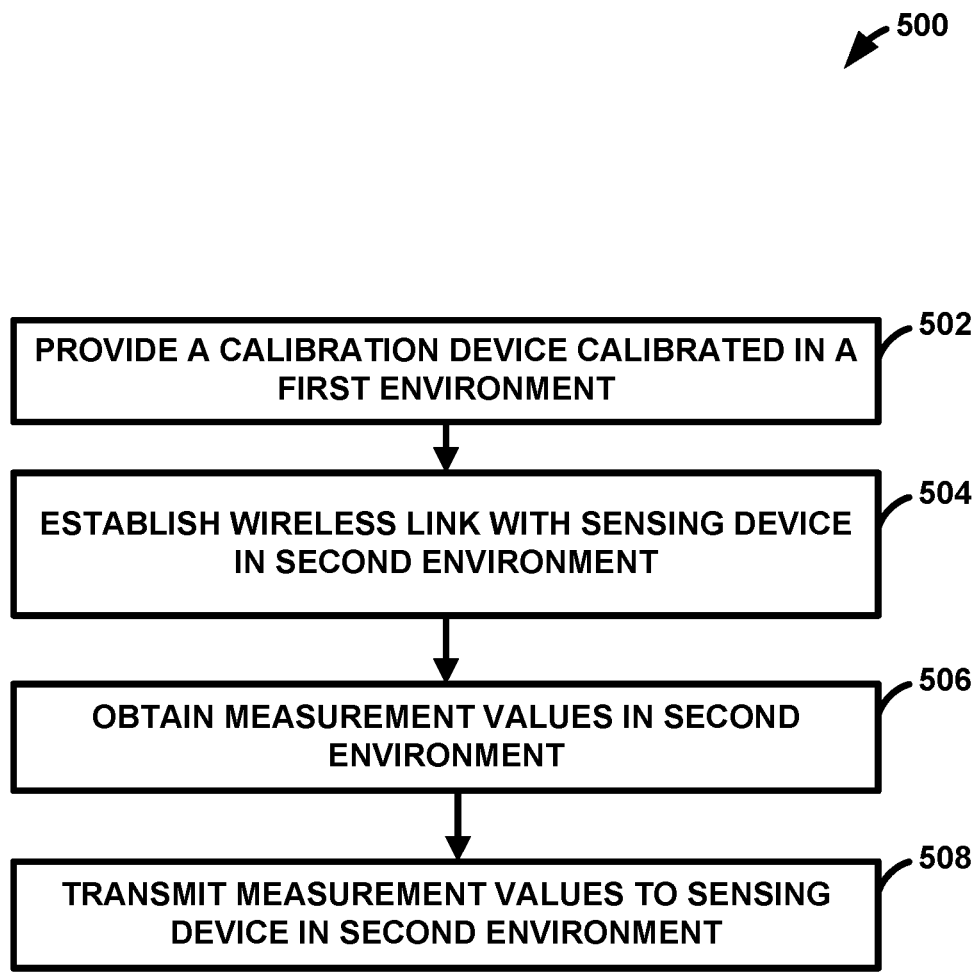
FIG. 5 is a flowchart depicting an example process that the calibration device of FIG. 1 may implement to perform a remote calibration, in accordance with aspects of this disclosure.

FIG. 5 is a flowchart depicting an example process that calibration device 10 may implement to perform a remote calibration, in accordance with aspects of this disclosure. In some examples, calibration device 10 may calibrate remote sensing device 80A. As such, process 500 may first include the provision of calibration device 10 (502). Calibration device 10 is configured to communicate wirelessly with a plurality of sensing devices including remote sensing device 80A.

As described herein, calibration device 10 may perform a self-calibration process prior to calibrating remote sensing device 80A. As such, calibration device 10 may obtain, while operating in a first environment 60 (e.g., an environment for calibrating calibration device 10), a first set of measurement input values. Calibration device 10 may apply a first transform to the first set of measurement input values to determine one or more output measurement values. In response to an offset between a reference measurement value, such as a reference measurement value of reference sensor(s) 50, and the one or more output measurement values, calibration device 10 may adjust one or more settings, such as a calibration offset of calibration device 10.

In some examples, calibration device 10 may then establish, via communication circuitry 14, a wireless communication link with a first sensing device 80A (504). First sensing device 80A may be configured to obtain, when operating in a second environment 102, a plurality of sensor inputs that relate to a measurement parameter. Second environment 102 may include an example production environment (e.g., in or around a production vehicle), such as a production environment that is distinct from a development environment 60A and/or 60B where one or more of sensors 18 of calibration device 10 may be calibrated based on one or more reference sensor(s) 50A and/or 50B. First sensing device 80A may apply a second transform to the sensor inputs to determine a plurality of sensor outputs.

In addition, calibration device 10 may obtain a second set of measurement input values, where the second set of measurement input values relate to the measurement parameter of first sensing device 80A (506). As such, calibration device 10 may determine a second set of output measurement values from the second set of measurement input values in accordance with the first transform. In such instances, the second set of output measurement values correspond to the measurement parameter. Calibration device 10 may then utilize the second set of output measurement values to cause an adjustment to the second transform of first sensing device 80A. In an example, calibration device 10 may transmit the measurement values to first sensing device 80A (508). That is, calibration device 10 may transfer the second set of output measurement values to first sensing device 80A.

In another example, calibration device 10 may utilize the second set of output measurement values to cause the adjustment to first sensing device 80A by receiving, via communication circuitry 14, at least one sensor output from the plurality of sensor outputs of first sensing device 80A. Calibration device 10 may then determine, via processing circuitry 12, the adjustment to the second transform based upon a comparison of the second set of output measurement values to the at least one sensor output. In such examples, calibration device 10 may then communicate, via communication circuitry 14, the adjustment to first sensing device 80A.

In some examples, calibration device 10 may obtain the second set of measurement input values by obtaining at least a subset of the second set of measurement input values from a second sensing device 80B or from another sensor 83 of first sensing device 80A. In an example, the subset of the measurement inputs values includes a measurement value corresponding to altitude. That is, calibration device 10 may determine an altitude measurement from another sensing device 80B and use the altitude measurement to compensate and determine the second set of output measurement values that may fluctuate based on altitude, in this example.

Figure 6:
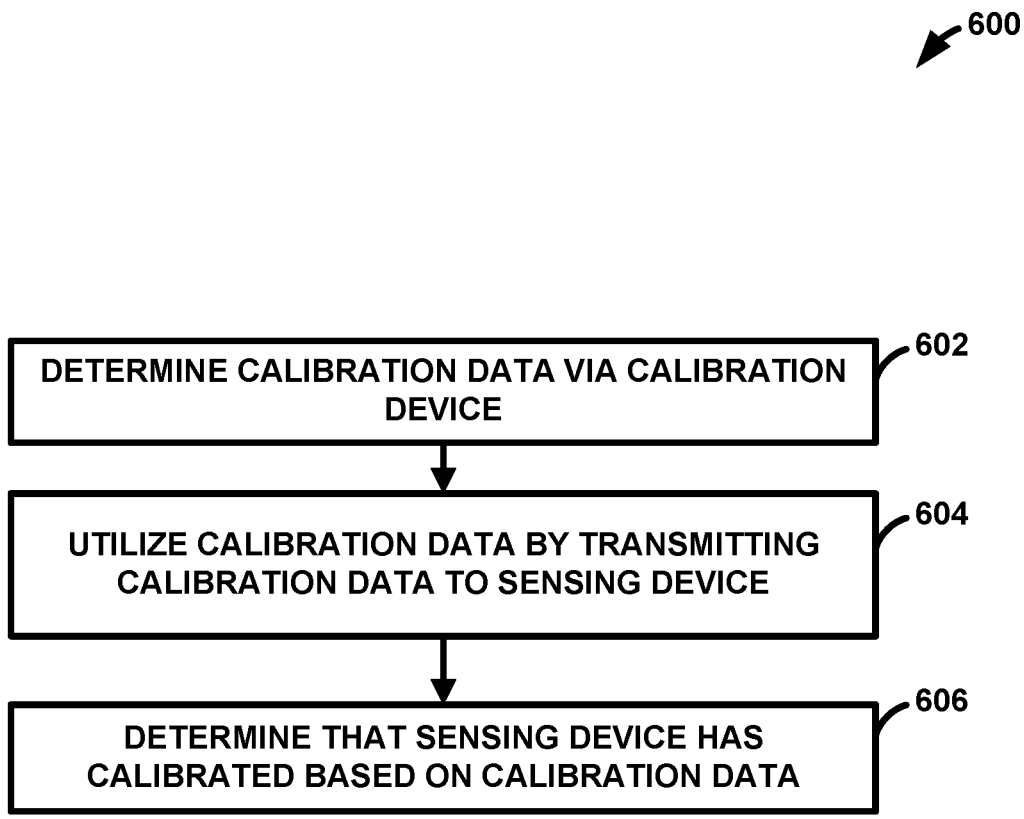
FIG. 6 is a flowchart depicting an example process that one or more of the remote sensing devices of FIG. 3 may implement to perform a sensor calibration, in accordance with aspects of this disclosure.

FIG. 6 is a flowchart depicting an example process 600 that one or more of the remote sensing devices 80 of FIG. 3 may implement to perform a sensor calibration, in accordance with aspects of this disclosure. In some examples, process 600 may be performed by a system of processors, such as processing circuitry 12 of calibration device 10 and processing circuitry 86A of remote sensing device 80A. In such examples, calibration device 10 may be configured to calibrate at least one remote sensing device 80A while the at least one sensing device 80A is integrated into a production environment 102. Calibration device 10 may first determine calibration data (e.g., measurement data 21, calibration settings, such as transform settings, etc.) (602). In an illustrative and non-limiting example, calibration device 10 may sense an air quality measurement from within the cabin of an aircraft.

In such examples, calibration device 10 is configured to utilize a calibration setting to sense data relating to at least one parameter of the production environment 102. The the calibration setting of calibration device 10 is preset in a development environment 60 that is separate and distinct from the production environment 102. In an example, calibration device 10 may calibrate based on measurement data received from reference sensor(s) 50 in one or more different development environments 60.

Calibration device may utilize calibration data to calibrate remote sensing device 80A by transmitting calibration data to remote sensing device 80A (604). In an example, calibration device 10 may communicate the calibration data (e.g., sensed measurement data) to at least one remote sensing device 80A while the remote sensing device 80A is integrated into the production environment 102. In this way, calibration device 10 may utilize the calibration data to calibrate remote sensing device 80A. In addition, the at least one sensing device 80A is configured to perform a calibration of one or more sensor components 83, sensor data 93 (e.g., transform settings, calibration settings, etc.) of the at least one sensing device 80A in response to receiving the calibration data from calibration device 10. In some examples, the one or more sensor components include one or more sensors 83A of the at least one remote sensing device 80A or one or more transform settings of the at least one remote sensing device 80A (e.g., stored as sensor data 93A). In such examples, calibration device 10 may receive, via communication circuitry 14, a confirmation signal from remote sensing device 80A, the signal indicating that remote sensing device 80A has calibrated based on calibration data received from calibration device 10 or alternatively, that remote sensing device 80A was unable to successfully calibrate (606).

In some examples, remote sensing device 80A may be configured to calibrate one or more transform settings (e.g., calibration settings) of remote sensing device 80A. In an example, remote sensing device 80A may determine, from measurement data received from calibration device 10 to adjust one or more transform settings. In some examples, the adjustment may include a slope parameter adjustment or an intercept parameter adjustment of the one or more transform settings of remote sensing device 80A. That is, remote sensing device 80A may apply a formula that includes adjustable slope and/or intercept parameters that remote sensing device 80A may adjust in view of measurement data received from calibration device 10.

In some examples, calibration device 10 may receive measurement data from remote sensing device 80A. Calibration device 10 may sense a corresponding measurement as sensed data. Calibration device 10 may utilize the sensed data to determine a measurement offset between a parameter measurement obtained from remote sensing device 80A and the sensed data. In such examples, calibration device 10 may perform an adjustment to the one or more sensor components remote sensing device 80A to counteract the measurement offset. In another example, remote sensing device 80A may receive the measurement offset information from calibration device 10 and perform an adjustment based on the measurement offset to the one or more sensor components of remote sensing device 80A to counteract the measurement offset.

In some examples, prior to performing the calibration, calibration device 10 or remote sensing device 80A may be configured to determine a proximity between remote sensing device 80A and calibration device 10. In an example, calibration device 10 may determine the proximity at a time when calibration device 10 senses the data relating to the at least one parameter of remote sensing device 80A. When the calibration device was not at the time within a predefined range of the at least one sensing device, however, calibration device 10 may provide a prompt, via calibration interface 25 (e.g., user interface 24), indicating that calibration device 10 is to obtain additional sensed data. This is because calibration device 10 may not have been close enough to sense measurement data 21 that would be analogous to what remote sensing device 80A would be sensing.

In the examples described, the production environment 102 may include an aircraft environment or a building environment. In addition, the development environment 60 may include a separate laboratory environment, such as one that houses reference sensor(s) 50.

In addition, calibration device 10 may be configured to store, via a traceability log, a summary of the calibration, including a timestamp indicating at what time the calibration occurred. In an example, calibration device 10 may receive, via communication circuitry 14, a confirmation signal from remote sensing device 80A that the calibration was successful. As such, calibration device 10 may create a summary of the calibration and transmit the data to a network computing device for storage. In some examples, regulatory authorities may require traceability data to be stored. The traceability data may identify the housing structure for remote sensing device 80A, identification data for remote sensing device 80A a time at which the calibration occurred, the adjustment amount (e.g., difference amount from the comparison of measurement values), and other data relevant to tracing a calibration of remote sensing device 80A.

Figure 7:
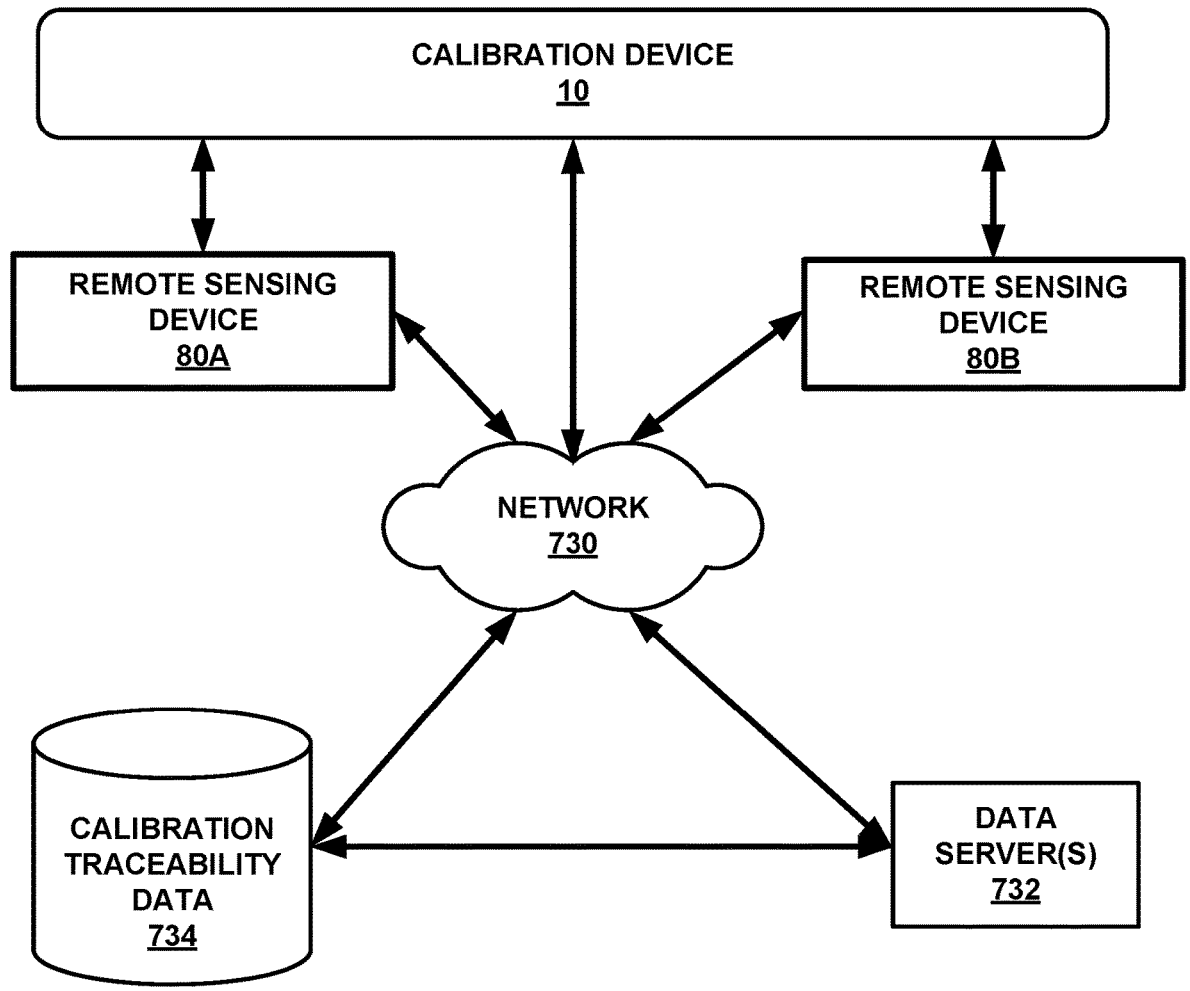
FIG. 7 is a conceptual block diagram of an example network environment in which the example calibration device may interface with one or more remote sensing devices and various network computing devices, in accordance with aspects of this disclosure.

FIG. 7 is a conceptual block diagram of an example network environment in which calibration device 10 may interface with one or more remote sensing devices 80 and various network computing devices, in accordance with aspects of this disclosure. In addition to calibration device 10 and remote sensing devices 80, the network environment may include data server(s) 732 and a database containing calibration traceability data 734. In some examples, calibration device 10 and/or remote sensing devices 80 may access and/or upload calibration traceability data 734 via network 730 to be stored in a network datastore. The network datastore may resemble storage device 20, in some examples. In addition, calibration device 10 and/or remote sensing devices 80 may transmit sensor data 93, measurement data 21, device calibration data 22, calibration traceability data 734, to data server(s) 732. In such examples, processing circuitry of data server(s) 732 may perform one or more of the various techniques of this disclosure. In an example, data server(s) 732 may receive measurement data 21 from calibration device 10 and measurement data from one or more of remote sensing devices 80. Data server(s) 732 may determine a calibration offset value from the measurement data and transmit the calibration offset to the one or more remote sensing devices 80. As such, some of the techniques of this disclosure may be implemented as software installed on one or more of the components of the calibration system shown in FIG. 7.

Network 730 may include any number of different types of network connections, including satellite connections and Wi-Fi™ connections. In an example, network 730 may include networks established using geosynchronous satellites, low-earth orbit satellites, global navigation satellite systems, cellular base station transceivers (e.g., for 3G, 4G, LTE, and/or 5G cellular network access), and/or Wi-Fi™ access points. In turn, the geosynchronous satellites and low-earth orbit satellites can communicate with gateways that provide access to network 730 for one or more devices implementing the calibration system. Cellular base station transceivers can have connections that provide access to network 730. These various satellite, cellular, and Wi-Fi™ network connections can be managed by different third-party entities, referred to herein as "carriers." In some examples, network 730 may include a wired system. In some examples, network 730 may include an ethernet system.

In some examples, one or more data server(s) 732 may be configured to receive input data from network 730, determine a transfer standard, in accordance with one or more techniques of this disclosure, and may output data to calibration device 10. In some examples, data server(s) 732 may include calibration traceability data 734.

Figure 8:
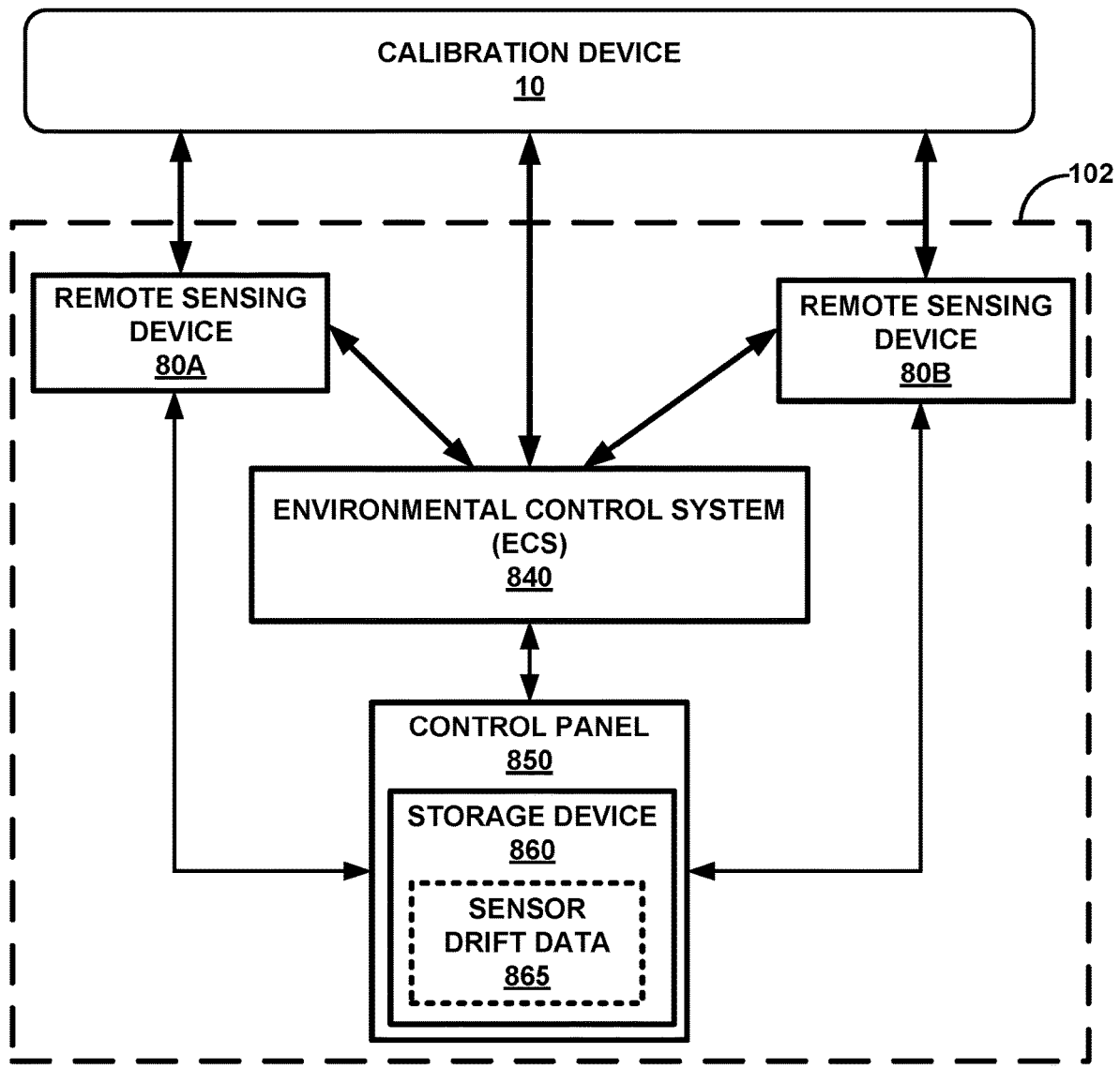
FIG. 8 is a conceptual block diagram of the example calibration device in conjunction with an environmental control system (ECS), in accordance with aspects of this disclosure.

FIG. 8 is a conceptual block diagram of the example calibration device 10 in conjunction with an environmental control system (ECS) 840, in accordance with aspects of this disclosure. The ECS 840 may interface with a control panel 850 via a controller of ECS 840, such as a computer having a processor and a memory, in continuous or intermittent communication with an air purification subsystem (not shown) and one or more remote sensing devices 80. ECS 840 may be implemented in a variety of different environments, including in or around a building, a vehicle (e.g., an aircraft, a spacecraft, etc.), or other structures where ECS 840 may control the environment 102 in or around the respective system.

In an example, Environmental Control System (ECS) 840 may operate to control the general comfort and safety in a vehicle or other structural environment, such as the environment of an aircraft, spacecraft, watercraft, mass-transit vehicle, buildings, and houses. ECS 840 may further operate to perform various secondary functions, such as to monitor aspects internal to ECS 840 or aspects internal to the overall system so to optimize performance of the entire system. In an example, ECS 840 in a building may manage energy consumption by controlling contaminant levels or by bringing in outside air to dilute contaminants. In addition, ECS 840 may perform such operations to provide a certain level of air quality in environment 102, such as in occupied environments, where the presence of a particularly compromised air quality could impact the health of, or impose a potentially life-threating risk to, various occupants of environment 102.

In various example applications, including those utilizing ECS 840, health monitoring systems, or various other control systems to perform system health or other operations, the applications invariably require some ability to sense the conditions of the particular operating environment. In a vehicle, for example, outside air may be conditioned and then circulated to various compartments or bays of the vehicle and a sensor system of the vehicle may utilize various remote sensing devices 80 to ensure conditions of the conditioned air adhere to commands of a control panel 850 of the vehicle. In an illustrative example, an aircraft may circulate conditioned air to various occupied compartments, cargo compartments, electronic equipment bays, etc. The aircraft may, in some examples, direct bleed air to various portions of the aircraft, for example, in attempt to remove the formation of ice that, if unremoved, may impact the health of the aircraft, such as by impacting the health of a system configured to support certain operations of the aircraft.

Such applications rely on the proper functioning of remote sensing device 80 to accurately and systematically detect changes in environment 102, where certain changes may impact the health of the system or use of the system in general. In some instances, certain changes may require the replacement of a particular part of the system or may require an adjustment to realign the system within safe or proper operating conditions.

In such examples, calibration device 10 may determine measurement values in environment 102. Environment 102 may include ECS 840 that is configured operate in accordance with information obtained via remote sensing device(s) 80. The calibration device may receive a set of measurement values from the sensing device indicating measurement values of what the remote sensing device 80A appears to be sensing. Calibration device 10 may then determine an adjustment for the remote sensing device based upon a comparison of what the remote sensing device 80 appears to be sensing and the measurement information available to the calibration device, such as what calibration device 10 is measuring. As such, the calibration device 10 may calibrate the remote sensing device via a wireless communication link between the calibration device and the remote sensing device by determining an adjustment for remote sensing device 80A and transmitting the adjustment to remote sensing device 80A.

In another example, calibration device 10 may determine measurement values in environment 102 and transmit the measurement values to remote sensing device 80A. Remote sensing device 80A may perform a calibration based on the measurement values obtained from calibration device 10, such as where remote sensing device 80A detects a mismatch between measurement values that remote sensing device 80A was measuring and the measurement values obtained from calibration device 10. Remote sensing device 80A may then transmit a confirmation to calibration device 10. In addition, remote sensing devices 80 may determine sensor drift data 865 based on an analysis of offset data changes over time. In some examples, remote sensing devices 80 may store sensor drift data 865 to storage device 860 of control panel 850. Sensor drift data 865 may be accessible by calibration device 10 via network 730 and calibration device 10 may reference sensor drift data 865 when determining whether to calibrate a particular one of remote sensing device 80.

In another illustrative example, remote sensing devices 80 may be positioned in various points throughout ECS 840 to sense contaminants in, and/or air characteristics of, the outside air supplied through engine or APU bleeds or other air sources including ground supplies and electric compressors, and/or recirculating air in ECS 840 and/or, in particular, an environment 102, such an aircraft cabin. The contaminants in environment 102 may include, for example, VOCs, SVOCs, formaldehyde, acetaldehyde, acrolein and other aldehydes, ultrafine particles (UFPs), carbon monoxide, carbon dioxide, and ozone.

One or more of remote sensing devices 80 can be any sensing device configured to sense the anticipated contaminants in the contaminated air. One or more of remote sensing devices 80 can sense the identity and amount of the individual contaminants in the contaminant air. For example, at least three classes of solid state gas sensors could be employed, individually or in combination with one another. In an illustrative example, a first example class of solid state gas sensors is cyclic voltammetry (CV) which is an electrochemical technique that measures the current that develops in an electrochemical cell under conditions where voltage is in excess of that predicted by the Nernst equation. CV measurement may cycle the potential of a working electrode and measure the resulting current. A second example class of remote sensing devices 80 may include catalytic combustion sensors (CCS). A third example class of remote sensing devices 80 may include conductometric or chemiresistor-based gas sensors. While described with reference to various example remote sensing devices 80, the techniques of this disclosure are not so limited, and a person skilled in the art will understand that sensors 80 can virtually be any sensor capable of sensing anticipated air characteristics, such as temperature, humidity, and pressure or gas composition, of the air in environment 102 or any other environment. In such examples, calibration device 10 may identify a class of sensor, sense measurement data 21 in environment 102 that corresponds to the class of sensor, and transmit the measurement data 21 to the remote sensing device 80. In response, remote sensing device 80 may calibrate by adjusting a setting of remote sensing device 80 to align sensed data of remote sensing device 80 with measurement data 21.

Figure 9:
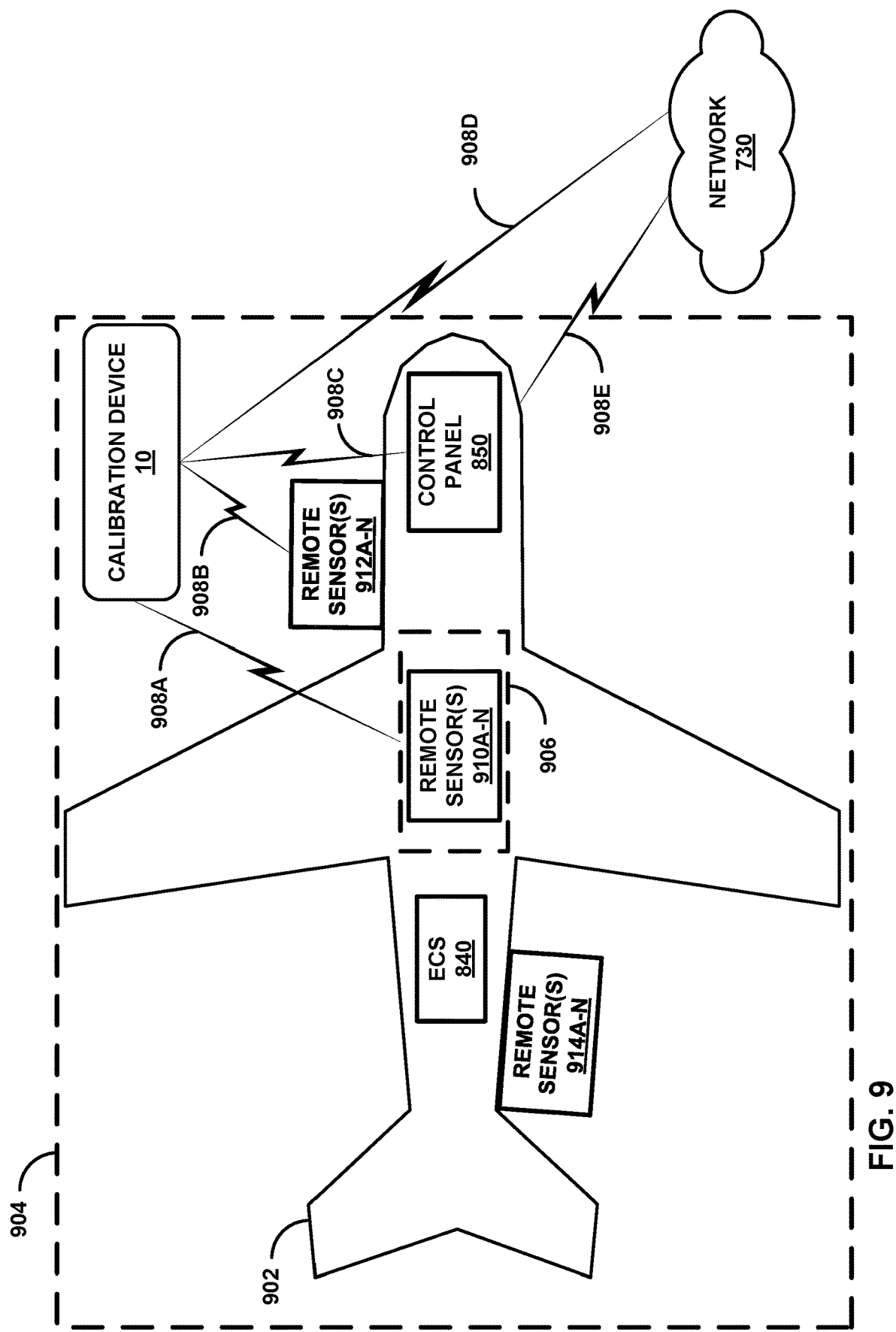
FIG. 9 is a conceptual block diagram of an example aircraft environment in which the example calibration device may interface with one or more sensors, in accordance with aspects of this disclosure.

FIG. 9 is a conceptual block diagram of an example aircraft environment in which the example calibration device 10 may interface with one or more sensors 910, in accordance with aspects of this disclosure.

While vehicle 902 is depicted as an airplane in this illustrative example, the techniques of this disclosure are not so limited, and vehicles 902 may include other vehicles, such as helicopters, hybrid tilt-rotor aircrafts, urban air vehicles, jet, quadcopters, hovercrafts, space shuttles, space stations, uncrewed aerial vehicle (UAV), flying robots, etc. Vehicles 902 may also include ground vehicles, such as cars, busses, trucks, etc., water vehicles, such as boats, ships, etc., or other vehicles.

The example of FIG. 9 illustrates different sensor environments. In a first example, a first outside environment 904 includes an outside of vehicle 902 (e.g., a first environment of production vehicle 902, etc.). As another example, a second environment 906 includes an inside of vehicle 902 (e.g., a second environment of production vehicle 902). The first environment 904 includes remote sensor(s) 914A-N and remote sensor(s) 912A-N. Second environment 906 includes remote sensor(s) 910A-N. Vehicle 902 further includes ECS 840 configured to operate in conjunction with remote sensor(s) 910A-N, remote sensor(s) 912A-N, or remote sensor(s) 914A-N. Calibration device 10 may calibrate any one of remote sensor(s) 910A-N, remote sensor(s) 912A-N, or remote sensor(s) 914A-N in accordance with one or more of the various techniques of this disclosure. In an example, calibration device 10 may establish one or more wireless communication links 908A-D with remote sensor(s) 910A-N, remote sensor(s) 912A-N, control panel 850, and/or network computing devices linked to network 730 (e.g., data server(s) 732, etc.). In addition, computing devices linked to network 730 may establish a wireless network connection with calibration device 10 or with vehicle 902.

In such examples, calibration device 10 may calibrate remote sensor(s) 912 or remote sensor(s) 910 and transmit a calibration summary to a network computing device of network 730. The computing device of network 730 may further receive communication from vehicle 902, such as from control panel 850 or from remote sensor(s) 910 or remote sensor(s) 912, indicating a calibration status of the one or more remote sensor(s) 910 or remote sensor(s) 912 following the calibration via calibration device 10. The network computing device may store such information as a record of calibration traceability data 734.

It has been recognized by air accident investigators, regulators, and pilot groups that flight safety can be compromised when pilots are exposed to oil-based contaminants in the ventilation air entering from outside the aircraft through main engine bleed air, auxiliary power unit (APU) bleed air, or other air sources including ground supplies and electric compressors. Buildings and high density ground transit have similar concerns and constraints. Providing a reliable sensor system that can detect various contaminants within a controlled range, however, involves the periodic calibration of the sensor system such that the sensor system is able to provide accurate output measurements. The one or more various techniques of this disclosure, including the techniques performed by calibration device 10, are configured to provide such a reliable sensor system in which calibration device 10 can calibrate the sensors of remote sensing devices 80 in an efficient and reliable manner.

In examples where vehicle 902 includes a flying vehicle, such as an aircraft, spacecraft, etc., calibration device 10 may perform a multi-stage calibration (e.g., a dynamic calibration) that employs similar calibration techniques to those described herein deployed over multiple stages of a calibration process. In an example, calibration device 10 may perform a primary calibration of one or more of remote sensor(s) 910A-N at a first time in a first environment (e.g., a "clean" environment). Calibration device 10 may additionally perform a supplementary calibration of the one or more of remote sensor(s) 910A-N at a second time in a second environment (e.g., within the aircraft while the aircraft is in-flight). In this way, calibration device 10 may sense a low level of some particulate matter, such as trace gases that are the products of combustion, for example, in the second environment (e.g., in-flight), and may receive a high level on the ground (e.g., at an airport gate). That is, calibration device 10 may perform a first stage (e.g., low level calibration) of remote sensor 910A and may perform a second stage (e.g., high level calibration) of remote sensor 910A, where the two stages are performed at different times and/or in different operating environments of vehicle 902 (e.g., in-flight, on ground, etc.), where levels of particulate matter may be expected to fluctuate in a fairly predictable manner (e.g., high to low levels and low to high levels).

In an illustrative example, a user of calibration device 10 may perform a low level calibration in a clean environment, such as put calibrator device 10 on the aircraft in-flight to get a low level of some gases, while performing a calibration on the ground at the gate to obtain a high level. That is, calibration device 10 may be utilized in environments, such as at altitude, to obtain a low-level sample of a particular particulate matter that corresponds to a particular one of remote sensor(s) 910A-N, and during ground operations of vehicle 902 to receive high levels of the particular particulate matter, and may transmit both sets of measurements to the particular one or more of remote sensor(s) 910A-N for both environments. The particular one or more of remote sensor(s) 910A-N may receive the measurement data from calibration device 10 and/or in some instances, from another one or more of remote sensor(s) 910A-N, remote sensor(s) 914A-N, and/or remote sensor(s) 912A-N. The particular one or more of remote sensor(s) 910A-N being calibrated may use the received measurement data to correct one or more internal offsets of the particular one or more of remote sensor(s) 910A-N.

In some examples, a first internal offset may be for a first internal sensor of remote sensor 910A (e.g., a gas sensor) and a second internal offset may be for a second internal sensor of remote sensor 910A (e.g., a humidity sensor). One or more of the internal offsets may be determined based on the measurement data received in the ground environment and the measurement data received in the in-flight environment to determine a calibration offset for the particular one or more of remote sensor(s) 910A-N. In an illustrative example, calibration device 10 may provide a first set of gas measurements to remote sensor 910A while vehicle 902 is on the ground and may provide a second set of gas measurements to remote sensor 910A while vehicle 902 is in-flight. Remote sensor 910A may correct a data measurement transform (e.g., measurement algorithm coefficients, constants, etc.) of remote sensor 910A based on the two sets of gas measurements and based on an expectation for how the measurements should behave.

In an illustrative and non-limiting example, a particular measurement should behave in such a way that remote sensor 910A is expected to measure higher levels (e.g., a first level) of a particulate matter in a first environment (e.g., at a first altitude, such as an on-ground environment) and may be expected to measure lower levels (e.g., a second level) of the same particulate matter in a second environment (e.g., at a second altitude, such as in-flight) and may be expected to measure a level of the same particulate matter that is different from the first or second levels when in another environment (e.g., at a third altitude, such as during ascent or descent of vehicle 902 or while driving on a particular incline, etc.).

In some examples, calibration device 10 may transmit measurement data to various ones of remote sensor(s) 910A-N, remote sensor(s) 912A-N, and/or remote sensor(s) 914A-N throughout and during various operating envelopes (e.g., on-ground, idling, etc.) in order to calibrate the sensor to measure accurate data in any of the various operating environments. Calibration device 10 and/or a particular remote sensor of vehicle 902 may interpolate between data points measured at different stages and/or extrapolate from data points measured at various stages to determine that data measurements of the remote sensor and calibration device 10 match in terms of interpolation and/or extrapolation trajectories. In this way, calibration device 10 may calibrate remote sensor(s) 80 based on a dynamic calibration model, rather than based on a static calibration model that may reference individual measurements at particular points in time without regard for dynamic changes (e.g., extrapolations, etc.) over time.

In some examples, calibration device 10 may measure a gas level on the ground and while ascending at 10,000 feet in the air and the remote sensor may perform the same measurement. Both devices may then perform the same measurement again during descent at 10,000 feet or at an altitude close thereto (e.g., within 200 feet or any other predefined margin). The devices may be configured to compare data (e.g., receive, transmit, and compare) to determine that the remote sensor is measuring data as expected and is thus, calibrated to a degree of calibration likelihood that then satisfies a calibration threshold. In some examples, calibration device 10 may be detachably installed in vehicle 902 (e.g., plugs into an insert) or may be a handheld calibration tool. In addition calibration device 10 may be detachably installed as a modular device, where external sensor(s) 18 may be added to sensor port(s) 17 and/or otherwise configured to communicate with processing circuitry 12 via communication circuitry 14. Sensor port(s) 17 may include a slot that external sensor(s) 18B may be inserted and in some examples, may include an electrical connector as well that then creates a wired connection between sensing circuitry 16, processing circuitry 12, etc.

As described herein, remote sensor 910A may, in some instances, signal a calibration confirmation to calibration device 10, and as such, may do so at both instances (e.g., on ground and in-flight, etc.). Calibration device 10 may provide such confirmation information on calibration interface 25. In this way, a user of calibration device 10 can be confident that the particular sensor (e.g., remote sensor 910A in this illustrative example), as well as one or more other remote sensor(s) of vehicle 902 have calibrated correctly across the plurality of environments. Calibration device 10 and/or remote sensor(s) 912A-N, remote sensor(s) 910A-N, and/or remote sensor(s) 914A-N, may transmit calibration confirmation data (e.g., confirmation information) to a network device (e.g., data server(s) 732, calibration traceability data 734, etc.) via network 730 for calibration traceability purposes (e.g., Federal Aviation Administration (FAA) audits, Occupational Safety and Health Administration (OSHA) permissible exposure limit (PEL) records, or other government records, OEM records, etc.).

As described herein, calibration confirmation data may include offset data (e.g., coefficients, constants, etc.), timestamps, drift rates (e.g., a first order derivative), drift rates over time (e.g., a second order derivative, etc.), details of the calibration, such as which sensors 83A-N, 85A-N, etc. and/or which compensation sensors 83A-N, 85A-N may have been involved in a particular calibration process, how far off the sensor was from the reliable measurement reading of calibration device 10, whether calibration device 10 determined to signal to a sensor a change in a measurement transform (e.g., a compensation algorithm that compensates a primary reading based on environmental factors receive), calibration failure data, and so forth. Calibration confirmation data may additionally be stored to storage device 92A or storage device 92B as sensor data 93A or sensor data 93B prior to, during, or after transmitting to calibration device 10 and/or data server(s) 732 (e.g., via network 730 or otherwise).

In some examples, calibration device 10 may relay the calibration confirmation data from a sensing device (e.g., remote sensor 910A, remote sensing device 80A, etc.) or from multiple sensing devices at any time prior to, during, or following any one or more of the various calibration techniques of this disclosure, including calibration confirmation data relating to primary sensors, compensation sensors, etc., and relating to various different environments (e.g., an in-flight environment of a production aircraft produced for private use, commercial use, etc., a wheels-on-ground environment of the production aircraft, etc.). Calibration device 10 may further perform various analyses on data received from one or more sensing devices (e.g., an offset drift analysis, projection modeling, etc.) and may, in some examples, relay the results of the analysis to a network device, as well.

In some examples, the network device may store all of the various data items and/or determine that a sensor should be replaced or predict that a sensor will need to be replaced, for example, based on high drift levels where the sensor (e.g., primary or compensation sensor) has reached a point where the sensor is identified as losing calibration efficacy and/or measurement accuracy quickly in a short period of time, rather than a longer period of time where such drift levels may be more acceptable from the viewpoint of interest parties (e.g., government entities, OEMs, customers, drivers, inhabitants, passengers, etc.).

Illustrative examples of the disclosure include:

Example 1: An apparatus for performing a sensor calibration, the apparatus comprising: a memory; communication circuitry configured to communicate with one or more sensing devices; and one or more processors coupled to the memory, wherein the one or more processors are configured to: identify a sensing device that has been affixed to a structure, wherein the sensing device senses measurement data relating to at least one parameter of an environment; determine one or more measurement values within the environment, wherein the one or more measurement values relate to the at least one parameter; transmit, via a wireless link, the one or more measurement values to the sensing device while the sensing device is affixed to the structure; and receive a confirmation signal from the sensing device indicating that an adjustment to the sensing device has occurred, wherein the adjustment to the sensing device is configured to occur in accordance with the one or more measurement values.

Example 2: An apparatus according to Example 1, wherein to determine the one or more measurement values, the one or more processors are configured to: determine a first measurement value that relates directly to the at least one parameter; determine a second measurement value that relates indirectly to the at least one parameter, wherein the second measurement value is separate and distinct from the first measurement value; and transmit the first measurement value and the second measurement value to the sensing device.

Example 3: An apparatus according to Example 2, wherein the one or more processors are further configured to: obtain the first measurement value from an air quality sensor; obtain the second measurement value from a compensation sensor; determine an output measurement value by performing a compensation algorithm using the second measurement value to determine a compensated output value relating to the first measurement value; and transmit the compensated output value to the sensing device.

Example 4: An apparatus according to Example 3, wherein the sensing device includes the air quality sensor and the compensation sensor, and wherein the compensation sensor includes one or more of: an altitude sensor, a pressure sensor, a temperature sensor, or a humidity sensor.

Example 5: An apparatus according to any combination of Examples 1 through 4, wherein the sensing device comprises a first sensing device, and wherein the one or more processors are further configured to: identify a second sensing device of the vehicle; transmit a second set of measurement values to the second sensing device; receive calibration data from the second sensing device, the calibration data indicating a discrepancy with a calibration of the second sensing device; and output, via a computing network, a summary of the calibration data relating to the second sensing device.

Example 6: An apparatus according to any combination of Examples 1 through 5, wherein to identify the sensing device, the one or more processors are configured to: determine the at least one parameter that the sensing device is configured to sense; and determine the one or more measurement values that relate to the at least one parameter.

Example 7: An apparatus according to any combination of Examples 1 through 6, wherein the confirmation indicates a time at which the sensing device performed the adjustment, and wherein the one or more processors are further configured to: transmit a summary of the confirmation to a network computing device.

Example 8: An apparatus according to Example 7, wherein the summary indicates a rate at which an output of the sensing device is drifting relative to a calibration offset.

Example 9: An apparatus according to any combination of Examples 7 or 8, wherein the structure comprises an aircraft, and wherein the sensing device is configured to be physically attached within the aircraft at the time the adjustment of the sensing device occurs, and wherein the sensing device is configured to sense cabin air quality of the aircraft.

Example 10: A system comprising: at least one sensing device; and a calibration device, the calibration device configured to calibrate the at least one sensing device while the at least one sensing device is integrated into a production environment, wherein the calibration device is configured to: utilize a calibration setting to sense data relating to at least one parameter of the production environment, wherein the calibration setting is preset in a development environment that is separate and distinct from the production environment; and communicate the sensed data to the at least one sensing device while the at least one sensing device is integrated into the production environment, wherein the at least one sensing device is configured to perform a calibration of one or more sensor components of the at least one sensing device in response to receiving the sensed data from the calibration device.

Example 11: A system according to Example 10, wherein the one or more sensor components include one or more sensors of the at least one sensing device or one or more transform settings of the at least one sensing device.

Example 12: A system according to Example 11, wherein calibration of the one or more transform settings includes an adjustment to a slope parameter or an intercept parameter of the one or more transform settings.

Example 13: A system according to any combination of Examples 10 through 12, wherein to perform the calibration, the at least one sensing device is configured to: utilize the sensed data to determine a measurement offset between a parameter measurement obtained from the at least one sensing device and the sensed data; perform an adjustment to the one or more sensor components to counteract the measurement offset.

Example 14: A system according to any combination of Examples 10 through 13, wherein prior to performing the calibration, the calibration device is further configured to: determine a proximity between the at least one sensing device and the calibration device at a time when the calibration device senses the data relating to the at least one parameter; and when the calibration device was not at the time within a predefined range of the at least one sensing device, provide a prompt, via a user interface, indicating that the calibration device is to obtain additional sensed data.

Example 15: A system according to any combination of Examples 10 through 14, wherein the production environment includes an aircraft environment or a building environment, and wherein the development environment includes a separate laboratory environment, and wherein the calibration device comprises a handheld portable device.

Example 16: A system according to any combination of Examples 10 through 15, wherein the calibration device is further configured to: store, via a traceability log, a summary of the calibration, including a timestamp indicating at what time the calibration occurred.

Example 17: A method for calibrating a first sensing device, the method comprising: providing a calibration device configured to communicate wirelessly with a plurality of sensing devices, the calibration device configured to: obtain, while operating in a first environment, a first set of measurement input values, apply a first transform to the first set of measurement input values to determine one or more output measurement values, and in response to an offset between a reference measurement value and the one or more output measurement values, adjust one or more settings of the calibration device, establishing, via communication circuitry of the calibration device, a wireless communication link with a first sensing device of the plurality of sensing device, the first sensing device configured to: obtain, when operating in a second environment, a plurality of sensor inputs that relate to a measurement parameter, and apply a second transform to the sensor inputs to determine a plurality of sensor outputs; wherein the method further comprises: obtaining, via the calibration device, a second set of measurement input values, wherein the second set of measurement input values relate to the measurement parameter; determining, via the calibration device, a second set of output measurement values from the second set of measurement input values in accordance with the first transform, the second set of output measurement values corresponding to the measurement parameter; and utilizing the second set of output measurement values to cause an adjustment to the second transform of the first sensing device.

Example 18: A method according to Example 17, wherein obtaining the second set of measurement input values comprises: obtaining at least a subset of the second set of measurement input values from a second sensing device of the plurality of sensing devices, wherein the subset of the measurement inputs values includes a measurement value corresponding to altitude.

Example 19: A method according to Examples 18 or 19, wherein utilizing the second set of output measurement values to cause the adjustment comprises: transferring the second set of output measurement values to the first sensing device.

Example 20: A method according to any combination of Examples 17 through 19, wherein utilizing the second set of output measurement values to cause the adjustment comprises: receiving, via communication circuitry of the calibration device, at least one sensor output from the plurality of sensor outputs; determining, via processing circuitry of the calibration device, the adjustment to the second transform based upon a comparison of the second set of output measurement values to the at least one sensor output; and communicating, via communication circuitry of the calibration device, the adjustment to the first sensing device.

Any of a wide variety of processing devices, such as calibration device 10, other components that interface with calibration device 10 and/or implement one or more remote calibration techniques of this disclosure, or other central processing units, ASICs, graphical processing units, computing devices, or processing devices of any other type may perform process 400, process 500, or process 600 or portions or aspects thereof. Calibration device 10 and/or other components that interface with calibration device 10 and/or implement one or more techniques of calibration device 10 as disclosed herein may be implemented in any of a variety of types of circuit elements. For example, processing circuitry 12 of calibration device 10, or other components that interface with calibration device 10 and/or implement one or more techniques of calibration device 10, may be implemented as one or more ASICs, as a magnetic nonvolatile RAM or other types of memory, a mixed-signal integrated circuit, a central processing unit (CPU), an FPGA, a microcontroller, a programmable logic controller (PLC), a system on a chip (SoC), a subsection of any of the above, an interconnected or distributed combination of any of the above, or any other type of component or one or more components capable of being configured to calibrate one or more remote sensing devices 80, and perform other functions in accordance with any one or more of the various techniques of this disclosure.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included in components of calibration device 10 or other systems described herein. The terms "processor," "processing device," or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Various aspects of the disclosure have been described. These and other aspects are within the scope of the following claims.

What is claimed is:

1. An apparatus for performing a sensor calibration, the apparatus comprising:
    a memory;
    communication circuitry configured to communicate with one or more sensing devices; and
    one or more processors coupled to the memory, wherein the one or more processors are configured to:
        identify a sensing device that has been affixed to a structure, wherein the sensing device senses measurement data relating to at least one parameter of an environment;
        obtain, from the sensing device, the measurement data relating to the at least one parameter of the environment;
        determine, based on the measurement data, one or more measurement values within the environment, wherein the one or more measurement values relate to the at least one parameter;
        transmit, via a wireless link, the one or more measurement values to the sensing device while the sensing device is affixed to the structure;
        receive a confirmation signal from the sensing device indicating that an adjustment to the sensing device has occurred and a time at which the sensing device performed the adjustment, and wherein the adjustment to the sensing device is configured to occur in accordance with the one or more measurement values; and
        transmit a summary of the confirmation signal to a network computing device.

2. The apparatus of claim 1, wherein to determine the one or more measurement values, the one or more processors are configured to:
    determine a first measurement value that relates directly to the at least one parameter;
    determine a second measurement value that relates indirectly to the at least one parameter, wherein the second measurement value is separate and distinct from the first measurement value; and
    transmit the first measurement value and the second measurement value to the sensing device.

3. The apparatus of claim 2, wherein the one or more processors are further configured to:
    obtain the first measurement value from an air quality sensor;
    obtain the second measurement value from a compensation sensor;
    determine an output measurement value by performing a compensation algorithm using the second measurement value to determine a compensated output value relating to the first measurement value; and
    transmit the compensated output value to the sensing device.

4. The apparatus of claim 3, wherein the sensing device includes the air quality sensor and the compensation sensor, and wherein the compensation sensor includes one or more of: an altitude sensor, a pressure sensor, a temperature sensor, or a humidity sensor.

5. The apparatus of claim 1, wherein the sensing device comprises a first sensing device, and wherein the one or more processors are further configured to:
    identify a second sensing device of the structure;
    transmit a second set of measurement values to the second sensing device;
    receive calibration data from the second sensing device, the calibration data indicating a discrepancy with a calibration of the second sensing device; and
    output, via a computing network, a summary of the calibration data relating to the second sensing device.

6. The apparatus of claim 1, wherein to identify the sensing device, the one or more processors are configured to:
    determine the at least one parameter that the sensing device is configured to sense; and
    determine the one or more measurement values that relate to the at least one parameter.

7. The apparatus of claim 1, wherein the summary indicates a rate at which an output of the sensing device is drifting relative to a calibration offset.

8. The apparatus of claim 1, wherein the structure comprises an aircraft, and wherein the sensing device is configured to be physically attached within the aircraft at the time the adjustment of the sensing device occurs, and wherein the sensing device is configured to sense cabin air quality of the aircraft.

9. A system comprising:
at least one sensing device; and
a calibration device, the calibration device configured to calibrate the at least one sensing device while the at least one sensing device is integrated into a production environment, wherein the calibration device is configured to:
utilize a calibration setting to sense data relating to at least one parameter of the production environment, wherein the calibration setting is preset in a development environment that is separate and distinct from the production environment; and
communicate the sensed data to the at least one sensing device while the at least one sensing device is integrated into the production environment,
wherein the at least one sensing device is configured to perform a calibration of one or more sensor components of the at least one sensing device in response to receiving the sensed data from the calibration device, and
wherein to perform the calibration of the one or more sensor components, the at least one sensing device is configured to:
calibrate one or more transform settings of the at least one sensing device by performing an adjustment to a slope parameter or an intercept parameter of the one or more transform settings, or
calibrate the one or more transform settings or one or more sensors of the sensing device by:
determining a measurement offset between a parameter measurement obtained from the at least one sensing device and the sensed data; and
performing an adjustment to the one or more transform settings or the one or more sensors to counteract the measurement offset.

10. The system of claim 9, wherein to perform the calibration of the one or more sensor components, the at least one sensing device is configured to calibrate the one or more transform settings by performing the adjustment to the slope parameter or the intercept parameter of the one or more transform settings.

11. The system of claim 9, wherein to perform the calibration of the one or more sensor components, the at least one sensing device is configured to calibrate the one or more transform settings or the one or more sensors by at least:
determining the measurement offset between the parameter measurement obtained from the at least one sensing device and the sensed data;
performing the adjustment to the one or more sensor components to counteract the measurement offset.

12. The system of claim 9, wherein prior to performing the calibration, the calibration device is further configured to:
determine a proximity between the at least one sensing device and the calibration device at a time when the calibration device senses the data relating to the at least one parameter; and
when the calibration device was not at the time within a predefined range of the at least one sensing device, provide a prompt, via a user interface, indicating that the calibration device is to obtain additional sensed data.

13. The system of claim 9, wherein the production environment includes an aircraft environment or a building environment, and wherein the development environment includes a separate laboratory environment, and wherein the calibration device comprises a handheld portable device.

14. The system of claim 9, wherein the calibration device is further configured to:
store, via a traceability log, a summary of the calibration, including a timestamp indicating at what time the calibration occurred.

15. A method for calibrating a first sensing device, the method comprising:
providing a calibration device configured to communicate wirelessly with a plurality of sensing devices, the calibration device configured to:
obtain, while operating in a first environment, a first set of measurement input values,
apply a first transform to the first set of measurement input values to determine one or more output measurement values, and
in response to an offset between a reference measurement value and the one or more output measurement values, adjust one or more settings of the calibration device,
establishing, via communication circuitry of the calibration device, a wireless communication link with a first sensing device of the plurality of sensing device, the first sensing device configured to:
obtain, when operating in a second environment, a plurality of sensor inputs that relate to a measurement parameter, and
apply a second transform to the sensor inputs to determine a plurality of sensor outputs;
wherein the method further comprises:
obtaining, via the calibration device, a second set of measurement input values, wherein the second set of measurement input values relate to the measurement parameter;
determining, via the calibration device, a second set of output measurement values from the second set of measurement input values in accordance with the first transform, the second set of output measurement values corresponding to the measurement parameter; and
utilizing the second set of output measurement values to cause an adjustment to the second transform of the first sensing device.

16. The method of claim 15, wherein obtaining the second set of measurement input values comprises:
obtaining at least a subset of the second set of measurement input values from a second sensing device of the plurality of sensing devices, wherein the subset of the measurement inputs values includes a measurement value corresponding to altitude.

17. The method of claim 15, wherein utilizing the second set of output measurement values to cause the adjustment comprises:
transferring the second set of output measurement values to the first sensing device.

18. The method of claim 15, wherein utilizing the second set of output measurement values to cause the adjustment comprises:
receiving, via communication circuitry of the calibration device, at least one sensor output from the plurality of sensor outputs;
determining, via processing circuitry of the calibration device, the adjustment to the second transform based upon a comparison of the second set of output measurement values to the at least one sensor output; and communicating, via communication circuitry of the calibration device, the adjustment to the first sensing device.

* * * * *